(12) United States Patent
Jun

(10) Patent No.: US 10,448,027 B2
(45) Date of Patent: Oct. 15, 2019

(54) METHOD OF ENCODING VIDEO DATA, VIDEO ENCODER PERFORMING THE SAME AND ELECTRONIC SYSTEM INCLUDING THE SAME

(71) Applicant: SAMSUNG ELECTRONICS CO., LTD., Suwon-si (KR)

(72) Inventor: Sung-Ho Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 251 days.

(21) Appl. No.: 15/297,732

(22) Filed: Oct. 19, 2016

(65) Prior Publication Data

US 2017/0142424 A1 May 18, 2017

(30) Foreign Application Priority Data

Nov. 16, 2015 (KR) ........................ 10-2015-0160176

(51) Int. Cl.

| H04N 19/167 | (2014.01) |
|---|---|
| H04N 19/103 | (2014.01) |
| H04N 19/176 | (2014.01) |
| H04N 19/184 | (2014.01) |
| H04N 19/124 | (2014.01) |
| H04N 19/132 | (2014.01) |
| H04N 19/174 | (2014.01) |
| H04N 19/17 | (2014.01) |

(52) U.S. Cl.
CPC ......... *H04N 19/167* (2014.11); *H04N 19/103* (2014.11); *H04N 19/124* (2014.11); *H04N 19/132* (2014.11); *H04N 19/17* (2014.11); *H04N 19/174* (2014.11); *H04N 19/176* (2014.11); *H04N 19/184* (2014.11)

(58) Field of Classification Search
CPC .... H04N 19/124; H04N 19/167; H04N 19/17; H04N 19/176
USPC .................................................... 375/240.14
See application file for complete search history.

(56) References Cited

U.S. PATENT DOCUMENTS

| 6,477,201 B1 | 11/2002 | Wine et al. | |
|---|---|---|---|
| 6,633,676 B1 | 10/2003 | Kleihorst et al. | |
| 7,702,513 B2 | 4/2010 | Kishi | |
| 7,724,972 B2 | 5/2010 | Wang et al. | |
| 8,804,818 B2 | 8/2014 | Puri et al. | |
| 2008/0117295 A1* | 5/2008 | Ebrahimi .......... | G08B 13/19604 348/143 |
| 2008/0165861 A1* | 7/2008 | Wen ................... | H04N 19/139 375/240.26 |
| 2010/0098162 A1* | 4/2010 | Lu ...................... | H04N 19/139 375/240.13 |
| 2011/0235706 A1 | 9/2011 | Demircin et al. | |

(Continued)

*Primary Examiner* — Jamie J Atala
*Assistant Examiner* — Kathleen V Nguyen
(74) *Attorney, Agent, or Firm* — Sughrue Mion, PLLC

(57) ABSTRACT

In a method of encoding video data, an input picture is divided into a first picture corresponding to a region of interest (ROI) and a second picture corresponding to a non-region of interest (non-ROI). A third picture is generated by down-scaling the second picture. A quantization parameter for the ROI is determined based on the first picture. A quantization parameter for the non-ROI is determined based on the third picture. A compressed picture is generated by encoding the input picture based on the quantization parameter for the ROI and the quantization parameter for the non-ROI.

14 Claims, 22 Drawing Sheets

(56) References Cited

U.S. PATENT DOCUMENTS

| | | |
|---|---|---|
| 2014/0016703 A1 | 1/2014 | Denoual |
| 2014/0269901 A1 | 9/2014 | Shi |
| 2015/0016510 A1* | 1/2015 | Carlsson ................ H04N 19/15 375/240.03 |
| 2015/0208070 A1 | 7/2015 | Verzijp et al. |

* cited by examiner

METHOD OF ENCODING VIDEO DATA, VIDEO ENCODER PERFORMING THE SAME AND ELECTRONIC SYSTEM INCLUDING THE SAME

CROSS-REFERENCE TO RELATED APPLICATION

This application claims priority from Korean Patent Application No. 10-2015-0160176, filed on Nov. 16, 2015 in the Korean Intellectual Property Office, the contents of which are herein incorporated by reference in their entirety.

BACKGROUND

1. Technical Field

Example embodiments relate generally to video processing, and more particularly, to methods of encoding video data, video encoders performing the methods and electronic systems including the video encoders.

2. Description of the Related Art

According to increasing demands for high resolution and high quality videos, such as high definition (HD) videos, ultra HD (UHD) videos, etc., research has focused on a video data compression for achieving improved compression performance.

Recently, a mobile device or a portable device has evolved to complex systems including various functions such as multimedia, graphics, an interface, a security, etc. As diverse capabilities and functionality converge in the mobile device that are battery-powered, researches are conducting various research projects on techniques of encoding video data in the mobile device while enhancing compression efficiency.

SUMMARY

One or more example embodiments provide a method of encoding video data capable of efficiently compressing high quality video data based on region of interest (ROI) information.

Further, one or more example embodiments provide a video encoder capable of efficiently compressing high quality video data based on ROI information.

Further still, one or more example embodiments provide an electronic system including the video encoder.

According to an aspect of example embodiments, in a method of encoding video data, an input picture is divided into a first picture corresponding to a region of interest (ROI) and a second picture corresponding to a non-region of interest (non-ROI). A third picture is generated by down-scaling the second picture. A quantization parameter for the ROI is determined based on the first picture. A quantization parameter for the non-ROI is determined based on the third picture. A compressed picture is generated by encoding the input picture based on the quantization parameter for the ROI and the quantization parameter for the non-ROI.

According to an aspect of example embodiments, in a method of encoding video data, an input picture is divided into a first picture corresponding to a region of interest (ROI) and a second picture corresponding to a non-region of interest (non-ROI). A third picture is generated by down-scaling the second picture. A first reference picture is generated by performing a prediction based on the first picture. A second reference picture is generated by performing the prediction based on the third picture. A compressed picture is generated by encoding the input picture based on the first reference picture and the second reference picture.

According to an aspect of example embodiments, a video encoder includes a picture analysis module, a rate control module and a compression module. The picture analysis module divides an input picture into a first picture corresponding to a region of interest (ROI) and a second picture corresponding to a non-region of interest (non-ROI), and generates a third picture by down-scaling the second picture. The rate control module determines a quantization parameter for the ROI based on the first picture, and determines a quantization parameter for the non-ROI based on the third picture. The compression module generates a compressed picture by encoding the input picture based on the quantization parameter for the ROI and the quantization parameter for the non-ROI.

According to an aspect of example embodiments, an electronic system includes a video source and a video encoder. The video source provides an input picture. The video encoder generates a compressed picture by encoding the input picture. The video encoder includes a picture analysis module, a rate control module and a compression module. The picture analysis module divides the input picture into a first picture corresponding to a region of interest (ROI) and a second picture corresponding to a non-region of interest (non-ROI), and generates a third picture by down-scaling the second picture. The rate control module determines a quantization parameter for the ROI based on the first picture, and determines a quantization parameter for the non-ROI based on the third picture. The compression module generates the compressed picture by encoding the input picture based on the quantization parameter for the ROI and the quantization parameter for the non-ROI.

According to an aspect of example embodiments, there is provided a method of encoding video data, the method including: dividing an input picture into a plurality of pictures comprising a first picture corresponding to an ROI and a second picture corresponding to a non-ROI; generating a third picture based on the second picture, the third picture having a bit-depth that is less than a bit-depth of the second picture; and encoding the input picture based on the first picture and the third picture.

BRIEF DESCRIPTION OF THE DRAWINGS

The above and other aspects of illustrative, non-limiting example embodiments will be more clearly understood from the following detailed description taken in conjunction with the accompanying drawings, in which.

DETAILED DESCRIPTION OF EXAMPLE EMBODIMENTS

Figure 1:
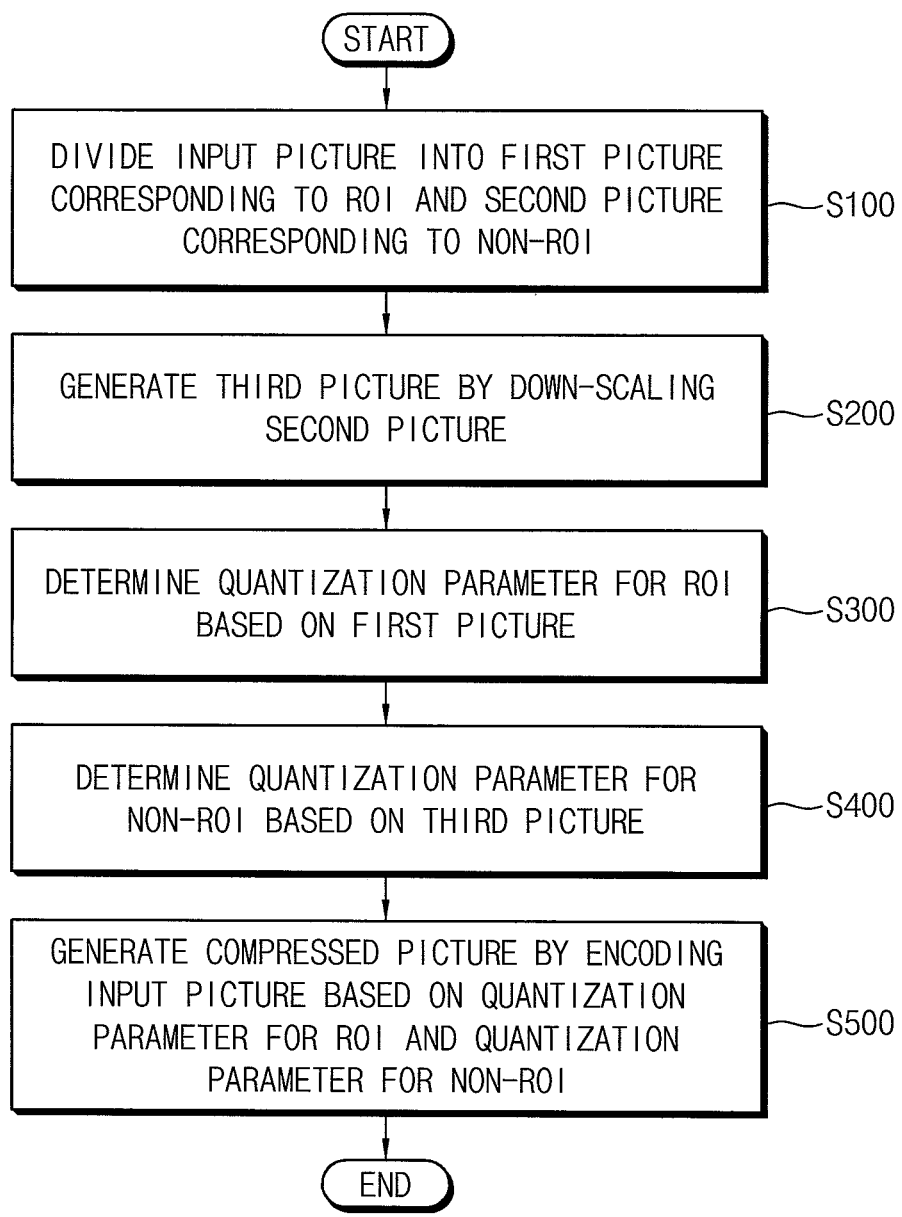
FIG. 1 is a flow chart illustrating a method of encoding video data according to an example embodiment.

Various example embodiments will be described more fully with reference to the accompanying drawings. Like reference numerals refer to like elements throughout this application.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Figure 2:
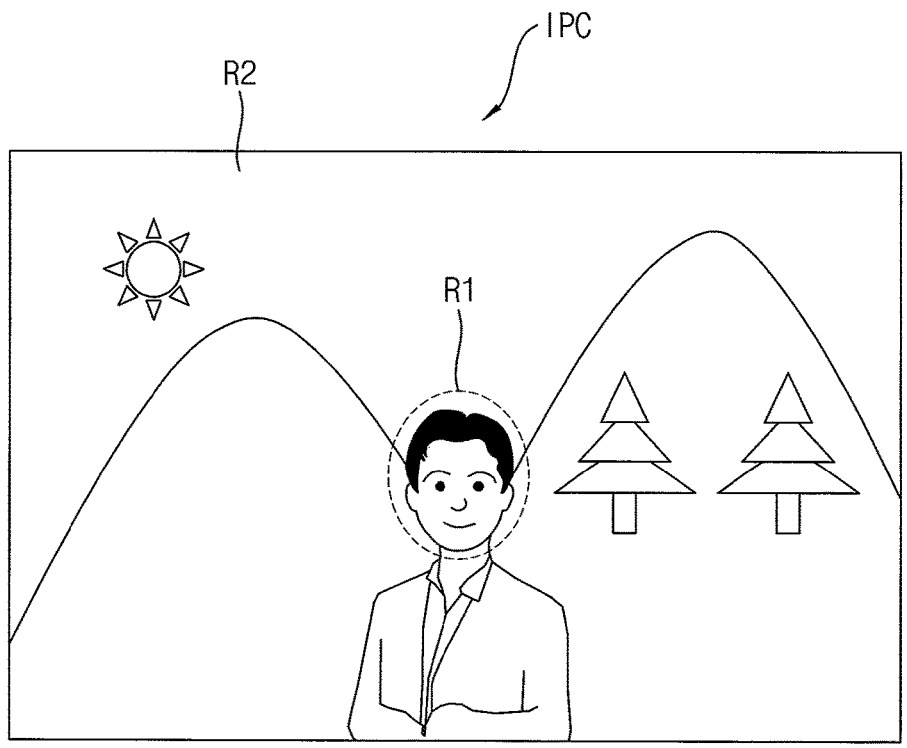
FIG. 2 is a diagram for describing the method of encoding the video data according to an example embodiment.

FIG. 1 is a flow chart illustrating a method of encoding video data according to example embodiments. FIG. 2 is a diagram for describing the method of encoding the video data according to example embodiments.

In this example embodiment, video data is encoded in units of a picture. For example, the video data may be encoded in units of the picture depending on standards such as MPEG (Moving Picture Expert Group), H.261, H.262, H.263, H.264, HEVC (High Efficiency Video Coding), etc. The picture may correspond to a frame in a progressive scan scheme or a field in an interlaced scan scheme. The encoded picture may be restored later by a decoder, and the restored picture may be stored in a buffer such as a decoded picture buffer (DPB). The stored picture may be used as a reference picture of motion estimation when decoding a next picture (or a subsequent picture).

Referring to FIGS. 1 and 2, in the method of encoding the video data according to example embodiments, an input picture is divided into a first picture and a second picture (S100). The first picture corresponds to a region of interest (ROI), and the second picture corresponds to a non-region of interest (non-ROI). For example, as illustrated in FIG. 2, an input picture IPC may be a single frame, and may include an object (e.g., a man, a human, or a person) and a background (e.g., the sun, mountains, trees, etc.). A ROI R1 may correspond to a region of the human's face, and a non-ROI R2 may correspond to a region other than the ROI R1 in the input picture IPC.

It is well known that certain spatial and temporal regions or objects in pictures are of more interest/importance to a user than other areas. For example, in video conferencing applications, the viewer may pay more attention to face regions when compared to other regions. In security applications, areas of potential activity (e.g., doors, windows, etc.) may be more important. These more important regions or the regions where the viewer pays more attention to may be referred to as ROIs.

A third picture is generated by down-scaling the second picture (S200). For example, the first and second pictures that are separated from the input picture IPC may have the same bit-depth, and a bit-depth of the third picture may be lower than each of the bit-depth of the first picture and the bit-depth of the second picture. In other words, the first picture may be a relatively high quality picture for the ROI R1, the second picture may be a relatively high quality picture for the non-ROI R2, and the third picture may be a relatively low quality picture for the non-ROI R2.

A bit-depth, which is also known as color depth, is either the number of bits used to indicate the color of a single pixel, in a bitmapped image or video frame buffer, or the number of bits used for each color component of a single pixel. For consumer video standards, such as HEVC (or H.265), the bit depth specifies the number of bits used for each color component. When referring to a pixel, the concept can be defined as bits per pixel (bpp), which specifies the number of bits used. When referring to a color component, the concept can be defined as bits per component, bits per channel, bits per color (all three abbreviated bpc), and also bits per pixel component, bits per color channel or bits per sample (bps). Color depth is one aspect of color representation, expressing how finely levels of color can be expressed (e.g., color precision); the other aspect is how broad a range of colors can be expressed (e.g., gamut). The definition of both color precision and gamut is accomplished with a color encoding specification which assigns a digital code value to a location in a color space.

A quantization parameter for the ROI R1 is determined based on the first picture (S300), and a quantization parameter for the non-ROI R2 is determined based on the third picture (S400). For example, the quantization parameter for the ROI R1 may be smaller than the quantization parameter for the non-ROI R2.

A compressed picture is generated by encoding the input picture IPC (e.g., by encoding the first and second pictures) based on the quantization parameter for the ROI R1 and the quantization parameter for the non-ROI R2 (S500). Based on a relatively small quantization parameter, the ROI R1 in the input picture IPC may be encoded with a relatively small loss. Based on a relatively large quantization parameter, the non-ROI R2 in the input picture IPC may be encoded with a relatively large loss.

In the method of encoding the video data according to example embodiments, the quantization parameter for the ROI R1 may be determined based on a partial picture having an original bit-depth, the quantization parameter for the non-ROI R2 may be determined based on the other partial picture having a reduced bit-depth, and then the original input picture IPC may be encoded based on the differently determined quantization parameters. In other words, an adaptive partial encoding may be performed with respect to the input picture IPC. Accordingly, the video data having relatively high quality may be efficiently encoded with relatively low power consumption.

Figure 3:
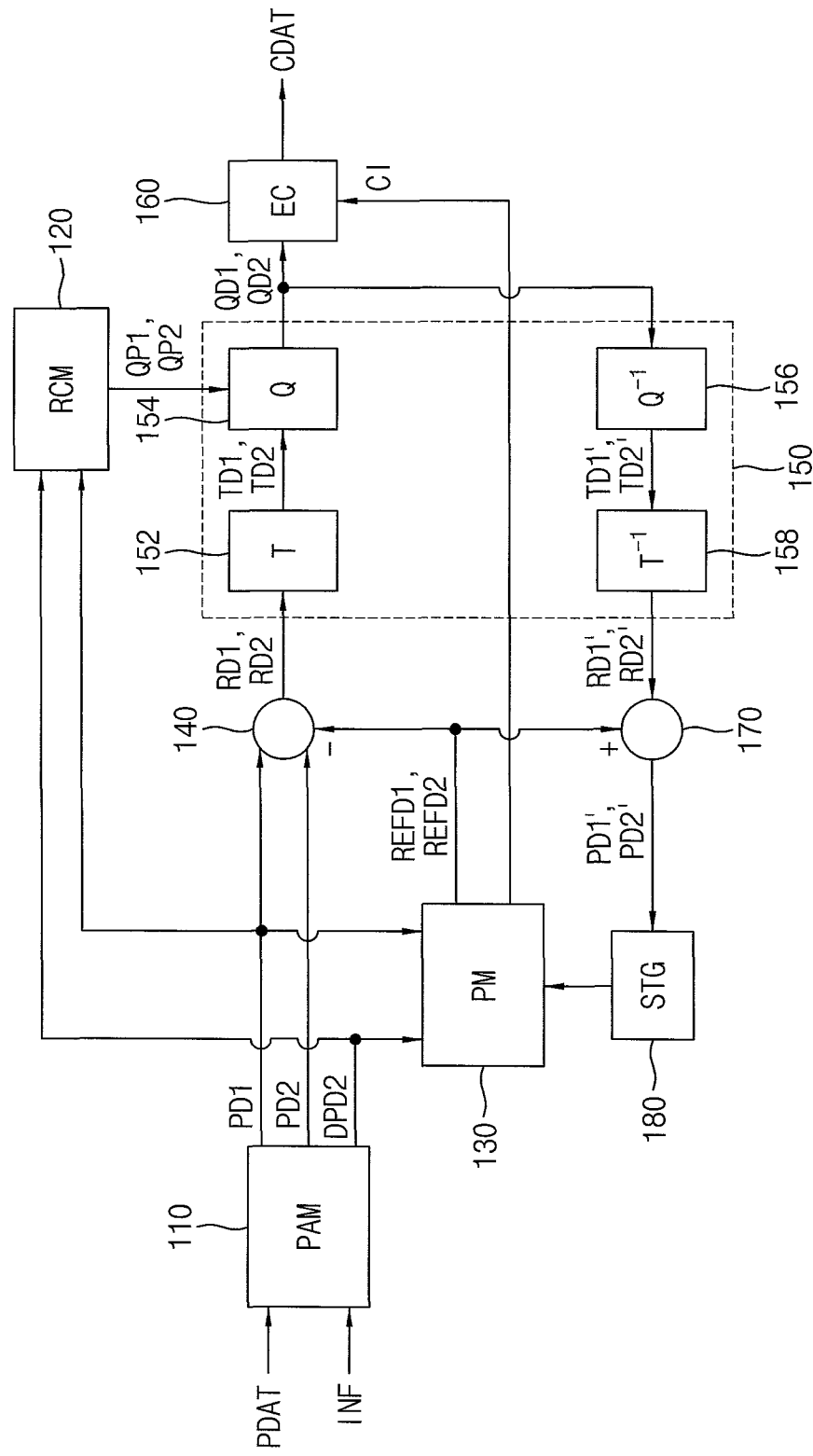
FIG. 3 is a block diagram illustrating a video encoder according to an example embodiment.

FIG. 3 is a block diagram illustrating a video encoder according to example embodiments.

In this example embodiment, a video encoder is configured to encode video data in units of a picture. A video encoder 10 of FIG. 3 may perform at least one of the method of encoding the video data of FIG. 1 and a method of encoding video data of FIG. 19.

Referring to FIGS. 2 and 3, the video encoder 10 includes a picture analysis module (PAM) 110, a rate control module (RCM) 120 and a compression module 150. The video encoder 10 may further include a prediction module (PM) 130, a subtractor 140, an entropy coder (EC) 160, an adder 170 and a storage (STG) 180.

The picture analysis module 110 divides input picture data PDAT into first picture data PD1 and second picture data PD2 based on ROI information INF, and generates third picture data DPD2 by down-scaling the second picture data PD2. The input picture data PDAT may be data of the input picture IPC. The first picture data PD1 may be data of the first picture that corresponds to the ROI R1. The second picture data PD2 may be data of the second picture, and the third picture data DPD2 may be data of the third picture. Each of the second picture and the third picture may correspond to the non-ROI R2.

In the video encoder 10 according to example embodiments, each of a bit-depth of the first picture and a bit-depth of the second picture may be higher than a bit-depth of the third picture. For example, each of the bit-depth of the first picture and the bit-depth of the second picture may be M, where M is a natural number, and the bit-depth of the third picture may be N, where N is a natural number less than M. In other words, each of the first picture data PD1 and the second picture data PD2 may be a M-bit color data (e.g., 10-bit color data), and the third picture data DPD2 may be a N-bit color data (e.g., 9-bit color data or 8-bit color data). For another example, the number of bits in the second picture data PD2 may be greater than the number of bits in the third picture data DPD2.

The ROI information INF may be information that represents locations of the ROI R1 and the non-ROI R2 in the input picture IPC. In some example embodiments, the ROI information INF may be provided from the user, may be obtained by detecting a specific region (e.g., a face region) in the input picture IPC, or may be obtained based on statistics or statistical information (e.g., variance) of the input picture IPC. As will be described with reference to FIG. 21, the video encoder 10 may further include a ROI detection module that generates the ROI information INF.

In some example embodiments, the picture analysis module 110 may perform the down-scaling based on at least one of various algorithms, such as nearest-neighbor interpolation, bilinear interpolation, bicubic interpolation, edge-directed interpolation, etc.

The rate control module 120 determines a quantization parameter QP1 for the ROI R1 based on the first picture data PD1, and determines a quantization parameter QP2 for the non-ROI R2 based on the third picture data DPD2.

In the video encoder 10 according to example embodiments, the quantization parameter QP1 for the ROI R1 may be smaller than the quantization parameter QP2 for the non-ROI R2. The quantization parameter QP2 for the non-ROI R2 may be efficiently set based on the third picture having a relatively low bit-depth.

In general, schemes for efficiently managing a stream size in the video encoder may be referred to as a rate control (RC). A budget for the rate control may be allocated to each picture or each group of pictures, and a target bit number may be allocated to each picture and/or each group of pictures within the allocated budget. The target bit number may be represented by the quantization parameter, and the bit number of the encoded data may decrease as the quantization parameter increases. In other words, the image quality of the encoded picture may be degraded as the quantization parameter increases, and may not be degraded as the quantization parameter decreases.

The prediction module 130 may generate first reference data REFD1 by performing a prediction based on the first picture data PD1, and may generate second reference data REFD2 by performing the prediction based on the third picture data DPD2. The first reference data REFD1 may be data of a first reference picture that is associated with the first picture, and the second reference data REFD2 may be data of a second reference picture that is associated with the second and third pictures.

In the video encoder 10 according to example embodiments, the prediction for the non-ROI R2 may be efficiently performed based on the third picture having a relatively low bit-depth.

For example, the prediction module 130 may perform at least one of an intra prediction (or an intra-picture prediction) and an inter prediction (or an inter-picture prediction) for the first picture and the third picture. The intra prediction may represent a prediction without reference to other pictures (e.g., predicted independently of other pictures), and the inter prediction may represent a prediction with reference to other pictures (e.g., predicted dependently of other pictures). When a currently encoded picture (e.g., the input picture IPC) is determined as an intra picture (e.g., intra-frame, intra-field, etc.), only the intra prediction may be performed for the currently encoded picture. When the currently encoded picture is determined as the inter picture (e.g., inter-frame, inter-field, etc.), both of the intra prediction and the inter prediction may be performed for the currently encoded picture. Herein, the intra picture may be referred to as an I picture, and the inter picture may be referred to as a P picture (predictive picture) and/or a B picture (bi-directional predictive picture).

A picture type may be determined with respect to each picture, and the intra prediction and/or the inter prediction may be performed for each picture, which are sequentially input to the video encoder 10, depending on the picture type indicating the I picture, the P picture or the B picture. For example, the prediction module 130 may include an intra prediction unit (or an intra-picture prediction unit) that performs the intra prediction, and an inter prediction unit (or an inter-picture prediction unit) that performs the inter prediction. When the input picture IPC is the I picture, the inter prediction unit may be disabled, and only the intra prediction unit may be enabled to perform the intra prediction. When the input picture IPC is the P picture or the B picture, both of the intra prediction unit and the inter prediction unit may be enabled to perform the intra prediction and the inter prediction, respectively. The intra prediction unit may perform the intra prediction to determine the encoding mode of the current picture without referring to other pictures. The inter prediction unit may perform the inter prediction to determine the encoding mode of the current picture by referring to the previous picture in the case of the P picture and by referring to the previous and next pictures in the case of the B picture.

The prediction module 130 may generate the first reference picture that corresponds to a result of at least one of the intra prediction and the inter prediction for the first picture, and the second reference picture that corresponds to a result of at least one of the intra prediction and the inter prediction for the third picture. For example, the prediction module 130 may include a mode decision unit that determines the encoding mode based on the result of at least one of the intra prediction and the inter prediction. The mode decision unit may provide information CI that includes the result of the predictions, a motion vector, the determined encoding mode, etc., and the first and second reference pictures that corresponds the determined encoding mode.

The subtractor 140 may generate first residual data RD1 by subtracting the first reference data REFD1 from the first picture data PD1, and may generate second residual data RD2 by subtracting the second reference data REFD2 from the second picture data PD2. The first residual data RD1 may be data of a first residual picture that is obtained by subtracting the first reference picture from the first picture, and the second residual data RD2 may be data of a second residual picture that is obtained by subtracting the second reference picture from the second picture.

The compression module 150 generates a compressed picture by encoding the input picture IPC based on the quantization parameter QP1 for the ROI R1 and the quantization parameter QP2 for the non-ROI R2. Since the compressed picture is generated further based on the first and second residual data RD1 and RD2, which are obtained based on the first and second reference data REFD1 and REFD2, it can be referred that the compressed picture may be generated based on the first and second reference data REFD1 and REFD2 (e.g., based on the first and second reference pictures).

The compression module 150 may include a transform unit (T) 152 and a quantization unit (Q) 154. The compression module 150 may further include an inverse quantization unit ($Q^{-1}$) 156 and an inverse transform unit ($T^{-1}$) 158.

The transform unit 152 may generate a first transformed data TD1 by performing a transformation based on the first picture data PD1, and may generate a second transformed data TD2 by performing the transformation based on the second picture data PD2. For example, the transform unit 152 may transform the first residual data RD1, which is obtained based on the first picture data PD1, into the first transformed data TD1. The transform unit 152 may transform the second residual data RD2, which is obtained based on the second picture data PD2, into the second transformed data TD2. The first transformed data TD1 may be data of a first transformed picture that corresponds to the first picture or the first residual picture, and the second transformed data TD2 may be data of a second transformed picture that corresponds to the second picture or the second residual picture.

In some example embodiments, the transform unit 152 may perform spatial transform with respect to the first and second residual pictures. The spatial transform may be one of discrete cosine transform (DCT), wavelet transform, etc. The transform coefficients, such as DCT coefficients, the wavelet coefficients, etc., may be obtained as a result of the spatial transform.

The quantization unit 154 may generate first quantized data QD1 by quantizing the first transformed data TD1 based on the quantization parameter QP1 for the ROI R1, and may generate second quantized data QD2 by quantizing the second transformed data TD2 based on the quantization parameter QP2 for the non-ROI R2. The first quantized data QD1 may be data of a first quantized picture that corresponds to the first picture or the first transformed picture, and the second quantized data QD2 may be data of a second quantized picture that corresponds to the second picture or the second transformed picture.

Through the quantization, such as scalar quantization, vector quantization, etc., the transform coefficients may be grouped into discrete values. For example, based on the scalar quantization, each transform coefficient may be divided by the corresponding value in the quantization table and the quotient may be rounded off to the integer.

In the case of adopting the wavelet transform, embedded quantization, such as embedded zerotrees wavelet algorithm (EZW), set partitioning in hierarchical trees (SPIHT), embedded zeroblock coding (EZBC), etc., may be used. Such encoding process before entropy coding may be referred to as a loss encoding process.

The entropy coder 160 may perform a lossless encoding with respect to the quantized data QD1 and QD2 and the information CI including the result of the predictions, the reference picture identifier, the motion vector, etc. to generate compressed data CDAT corresponding to the compressed picture. The lossless encoding may be arithmetic coding such as context-adaptive binary arithmetic coding (CABAC), variable length coding such as context-adaptive variable-length coding (CAVLC), etc.

The video encoder 10 may further include a buffer (e.g., an encoded picture buffer (EPB)) that is connected to the output of the entropy coder 160. In this case, the compressed data CDAT may be buffered in the buffer, and then may be output as a bit stream to an external device.

The inverse quantization unit 156 and the inverse transform unit 158 may be used to generate a reconstructed picture by reversely decoding the loss-encoded data. The quantized data QD1 and QD2 may be inverse-quantized by the inverse quantization unit 156. The inverse-quantized data TD1' and TD2' may be inverse-transformed by the inverse transform unit 158.

The adder 170 may restore the input picture by summing the inverse-transformed data RD1' and RD2' and the reference data REFD1 and REFD2. The restored picture data PD1' and PD2' may be stored in the storage 180, and may be used as the reference picture for encoding the other pictures.

The video encoder 10 may further include a deblocking filter that is connected between the adder 170 and the storage 180. The deblocking filter may perform a deblock filtering with respect to boundaries of pictures or picture blocks in each picture.

In the video encoder 10 according to example embodiments, at least one of the rate control module 120 and the prediction module 130 may use the third picture data DPD2 for processing the non-ROI R2, and the other elements in the video encoder 10 may use the second picture data PD2 for processing the non-ROI R2. In other words, the quantization parameter QP1 for the ROI R1 may be determined based on a partial picture having an original bit-depth, and the prediction for the ROI R1 may be performed based on the partial picture having the original bit-depth. The quantization parameter QP2 for the non-ROI R2 may be determined based on the other partial picture having a reduced bit-depth, and the prediction for the non-ROI R2 may be performed based on the other partial picture having the reduced bit-depth. Accordingly, the video data having relatively high quality may be efficiently encoded with relatively low power consumption.

Figure 4:
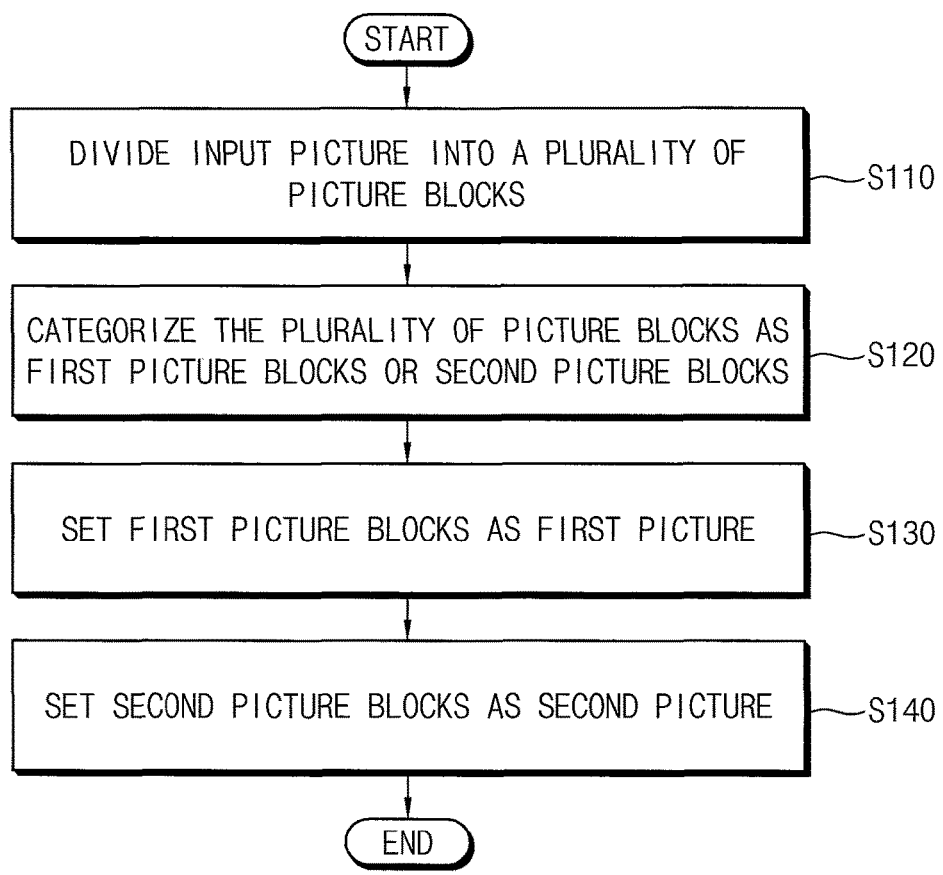
FIG. 4 is a flow chart illustrating an example of dividing an input picture into a first picture and a second picture in FIG. 1.
Figure 5:
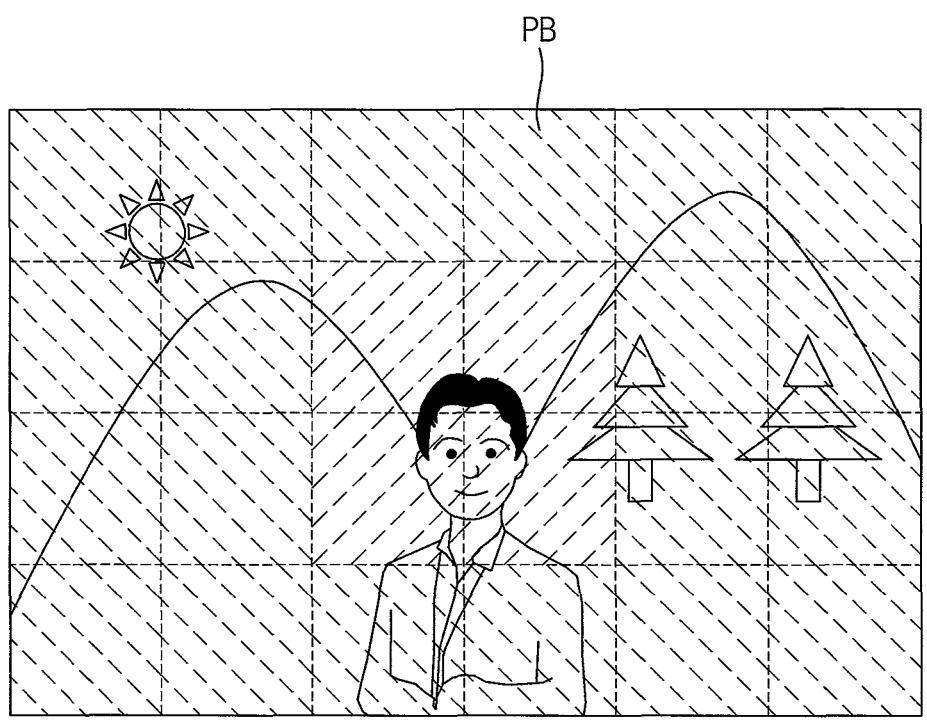
FIG. 5 is a diagram for describing an operation of FIG. 4.

FIG. 4 is a flow chart illustrating an example of dividing an input picture into a first picture and a second picture in FIG. 1. FIG. 5 is a diagram for describing an operation of FIG. 4.

Referring to FIGS. 1, 2, 4 and 5, in operation S100, the input picture IPC may be divided into a plurality of picture blocks PB (S110). For example, the plurality of picture blocks PB may have the same size, and may not overlap one another. In an example of FIG. 5, the input picture IPC may be divided into twenty-four picture blocks PB.

In some example embodiments, each picture block may be referred to as a macroblock in the H.264 standard. Each macroblock may include about 16*16 pixels. Alternatively, each picture block may be referred to as a coded tree unit (CTU) in the HEVC standard. A size of each CTU may be variable. For example, each CTU may include about 8*8 pixels, 16*16 pixels, 32*32 pixels, 64*64 pixels, etc.

The plurality of picture blocks PB may be categorized as first picture blocks RB or second picture blocks NRB (S120). The first picture blocks RB may correspond to the ROI R1, and the second picture blocks NRB may correspond to the non-ROI R2. For example, picture blocks that overlap the ROI R1 may be categorized as the first picture blocks RB, and picture blocks that do not overlap the ROI R1 may be categorized as the second picture blocks NRB.

The first picture blocks RB may be set as the first picture (S130), and the second picture blocks NRB may be set as the second picture (S140). In the example of FIG. 5, the first picture may include four picture blocks RB, and the second picture may include twenty picture blocks NRB.

In some example embodiments, when the input picture IPC is divided into the plurality of picture blocks PB, the input picture IPC may be encoded in units of a picture block. In other words, the down-scaling, determining the quantization parameter, the prediction, the transformation, the quantization, etc. that are described above with reference to FIGS. 1, 2 and 3 may be performed in units of the picture block.

The input picture IPC may be divided into the first and second pictures without dividing the input picture IPC into the plurality of picture blocks PB. For example, the input picture IPC may be divided into the first and second pictures in units of a pixel.

Figure 6:
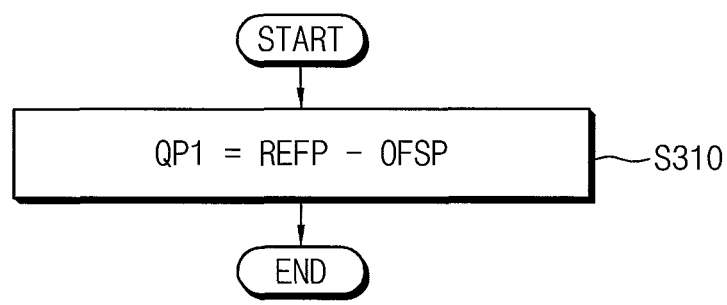
FIG. 6 is a flow chart illustrating an example of determining a quantization parameter for ROI in FIG. 1.
Figure 7:
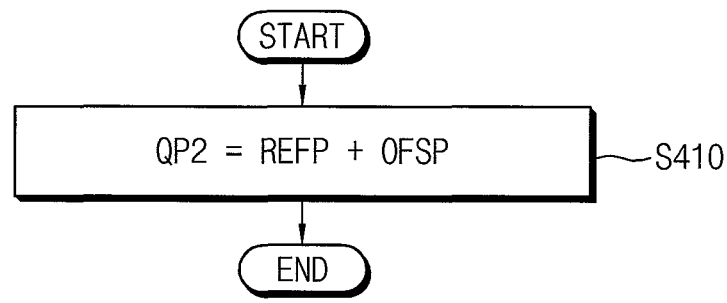
FIG. 7 is a flow chart illustrating an example of determining a quantization parameter for non-ROI in FIG. 1.

FIG. 6 is a flow chart illustrating an example of determining a quantization parameter for ROI in FIG. 1. FIG. 7 is a flow chart illustrating an example of determining a quantization parameter for non-ROI in FIG. 1.

Referring to FIGS. 1, 2 and 6, in operation S300, the quantization parameter QP1 for the ROI R1 may be set by subtracting an offset parameter OFSP from a reference parameter REFP (S310). In other words, the quantization parameter QP1 for the ROI R1 may be smaller than the reference parameter REFP.

Referring to FIGS. 1, 2 and 7, in operation S400, the quantization parameter QP2 for the non-ROI R2 may be set by adding the offset parameter OFSP to the reference parameter REFP (S410). In other words, the quantization parameter QP2 for the non-ROI R2 may be greater than the reference parameter REFP. Thus, when the input picture IPC is encoded based on the different quantization parameters QP1 and QP2, the ROI R1 in the encoded picture may have improved image quality as compared to that of the non-ROI R2 in the encoded picture.

In some example embodiments, the offset parameter OFSP may be variable depending on the input picture IPC.

According to example embodiments, the offset parameter OFSP in FIG. 6 that is used to determine the quantization parameter QP1 for the ROI R1 may be substantially the same as or different from the parameter OFSP in FIG. 7 that is used to determine the quantization parameter QP2 for the non-ROI R2.

Figure 8:
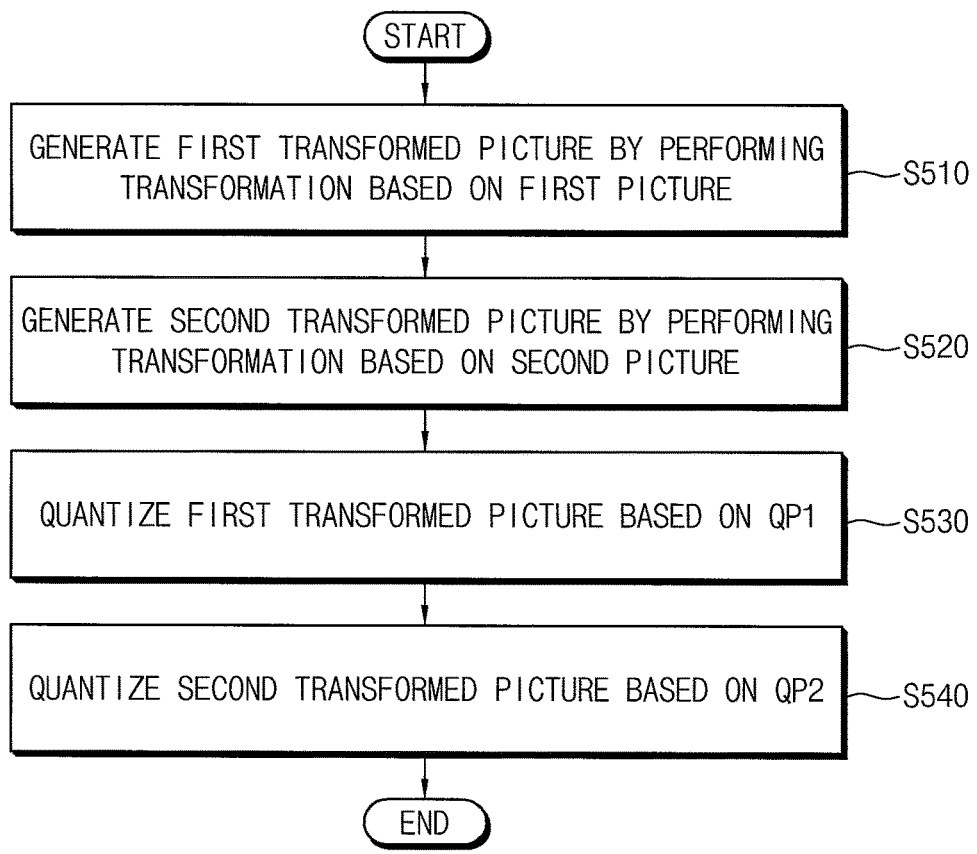
FIG. 8 is a flow chart illustrating an example of generating a compressed picture in FIG. 1.

FIG. 8 is a flow chart illustrating an example of generating a compressed picture in FIG. 1.

Referring to FIGS. 1, 2 and 8, in operation S500, the first transformed picture may be generated by performing the transformation based on the first picture (S510), and the second transformed picture may be generated by performing the transformation based on the second picture (S520). For example, the first residual picture that is obtained based on the first picture may be transformed into the first transformed picture, and the second residual picture that is obtained based on the second picture may be transformed into the second transformed picture.

The first transformed picture may be quantized based on the quantization parameter QP1 for the ROI R1 (S530), and the second transformed picture may be quantized based on the quantization parameter QP2 for the non-ROI R2 (S540). For example, the first quantized picture may be generated by quantizing the first transformed picture based on the relatively small quantization parameter QP1, and the second quantized picture may be generated by quantizing the second transformed picture based on the relatively large quantization parameter QP2.

In some example embodiments, operations S100 and S200 in FIG. 1 and operations S110, S120, S130 and S140 in FIG. 4 may be performed by the picture analysis module 110 in FIG. 3. Operations S300 and S400 in FIG. 1, operation S310 in FIG. 6 and operation S410 in FIG. 7 may be performed by the rate control module 120 in FIG. 3. Operation S500 in FIG. 1 and operations S510, S520, S530 and S540 in FIG. 8 may be performed by the compression module 150 in FIG. 3.

Although the example embodiments are described based on an example where the input picture IPC includes a single ROI and a single non-ROI, the input picture IPC may include a plurality of (e.g., at least two of) ROIs and a plurality of non-ROIs that have different degree-of-interests. Hereinafter, the example embodiments will be described based on examples where the input picture IPC includes the plurality of ROIs and the plurality of non-ROIs.

Figure 9:
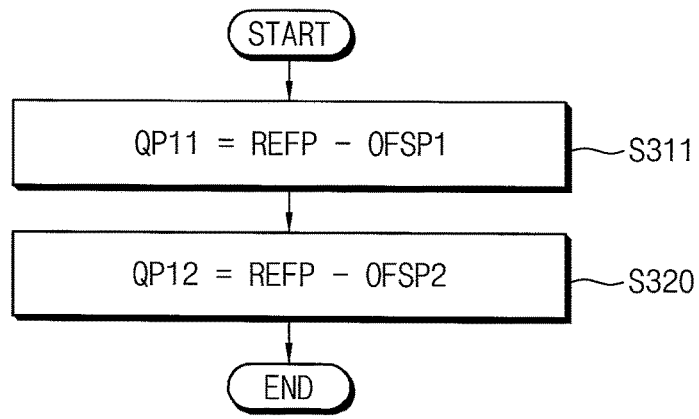
FIG. 9 is a flow chart illustrating another example of determining the quantization parameter for the ROI in FIG. 1.
Figure 10:
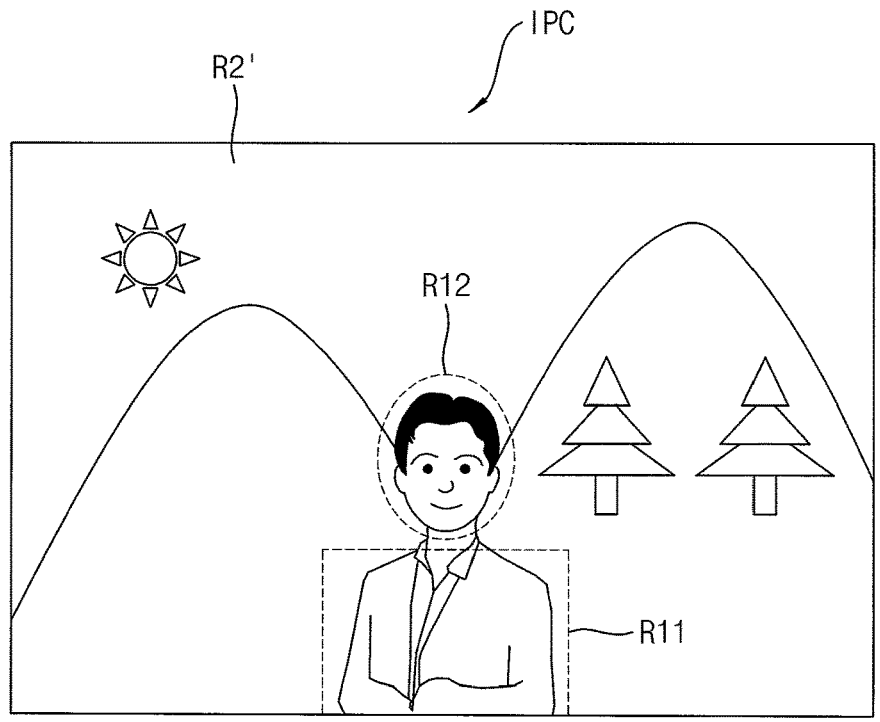
FIG. 10 is a diagram for describing an operation of FIG. 9.

FIG. 9 is a flow chart illustrating another example of determining the quantization parameter for the ROI in FIG. 1. FIG. 10 is a diagram for describing an operation of FIG. 9.

Referring to FIGS. 1, 9 and 10, in operation S300, the ROI may include a first ROI R11 and a second ROI R12 having a degree-of-interest higher than that of the first ROI R11. For example, in an input picture IPC of FIG. 10, the first ROI R11 may correspond to a region of the human's upper body, and the second ROI R12 may correspond to a region of the human's face. A non-ROI R2' may correspond to a region other than the ROIs R11 and R12 in the input picture IPC of FIG. 10.

A quantization parameter QP11 for the first ROI R11 may be set by subtracting a first offset parameter OFSP1 from a reference parameter REFP (S311), and a quantization parameter QP12 for the second ROI R12 by subtracting a second offset parameter OFSP2 from the reference parameter REFP (S320). The second offset parameter OFSP2 may be greater than the first offset parameter OFSP1. In other words, the quantization parameter QP12 for the second ROI R12 may be smaller than the quantization parameter QP11 for the first ROI R11.

Figure 11:
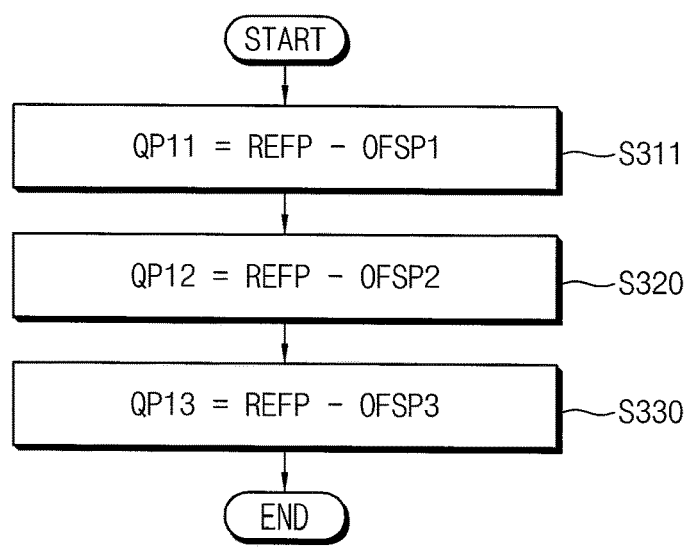
FIG. 11 is a flow chart illustrating still other example of determining the quantization parameter for the ROI in FIG. 1.
Figure 12:
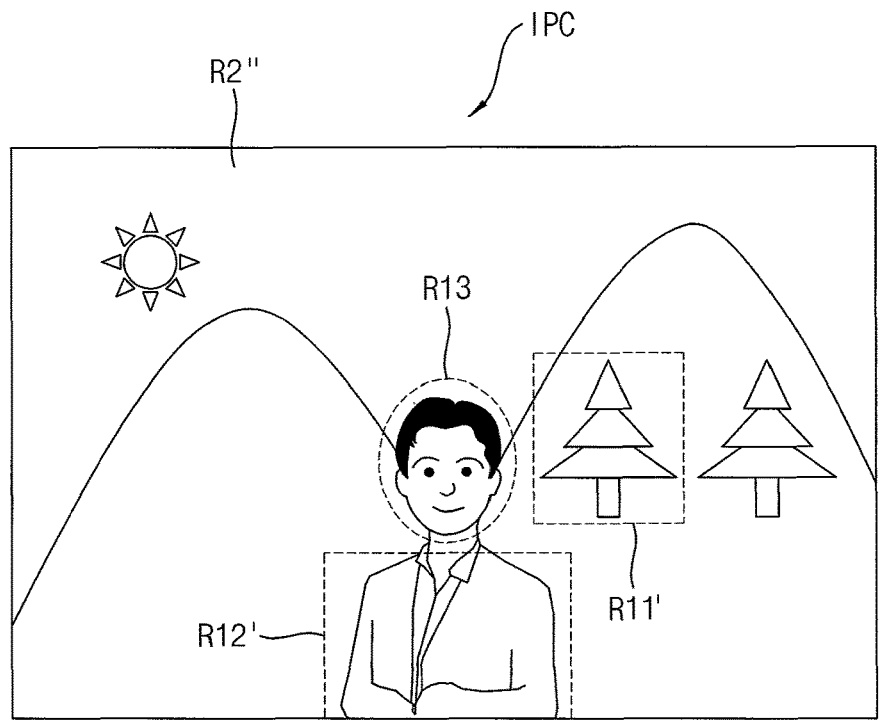
FIG. 12 is a diagram for describing an operation of FIG. 11.

FIG. 11 is a flow chart illustrating still other example of determining the quantization parameter for the ROI in FIG. 1. FIG. 12 is a diagram for describing an operation of FIG. 11.

Referring to FIGS. 1, 11 and 12, in operation S300, the ROI may include a first ROI R11', a second ROI R12' having a degree-of-interest higher than that of the first ROI R11', and a third ROI R13 having a degree-of-interest higher than that of the second ROI R12'. For example, in an input picture IPC of FIG. 12, the first ROI R11' may correspond to a region of a tree, the second ROI R12' may correspond to a region of the human's upper body, and the third ROI R13 may correspond to a region of the human's face. A non-ROI R2" may correspond to a region other than the ROIs R11', R12' and R13 in the input picture IPC of FIG. 12.

A quantization parameter QP11 for the first ROI R11' may be set by subtracting the first offset parameter OFSP1 from the reference parameter REFP (S311), a quantization parameter QP12 for the second ROI R12' by subtracting the second offset parameter OFSP2 from the reference parameter REFP (S320), and a quantization parameter QP13 for the third ROI R13 by subtracting a third offset parameter OFSP3 from the reference parameter REFP (S330). The second offset parameter OFSP2 may be greater than the first offset parameter OFSP1, and may be smaller than the third offset parameter OFSP3. In other words, the quantization parameter QP12 for the second ROI R12' may be smaller than the quantization parameter QP11 for the first ROI R11', and may be greater than the quantization parameter QP13 for the third ROI R13.

Figure 13:
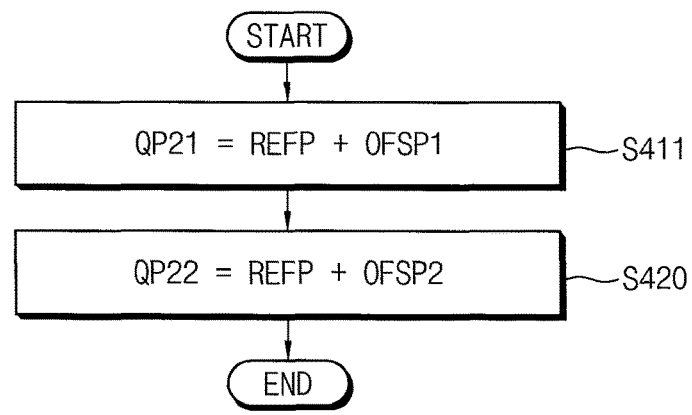
FIG. 13 is a flow chart illustrating another example of determining the quantization parameter for the non-ROI in FIG. 1.
Figure 14:
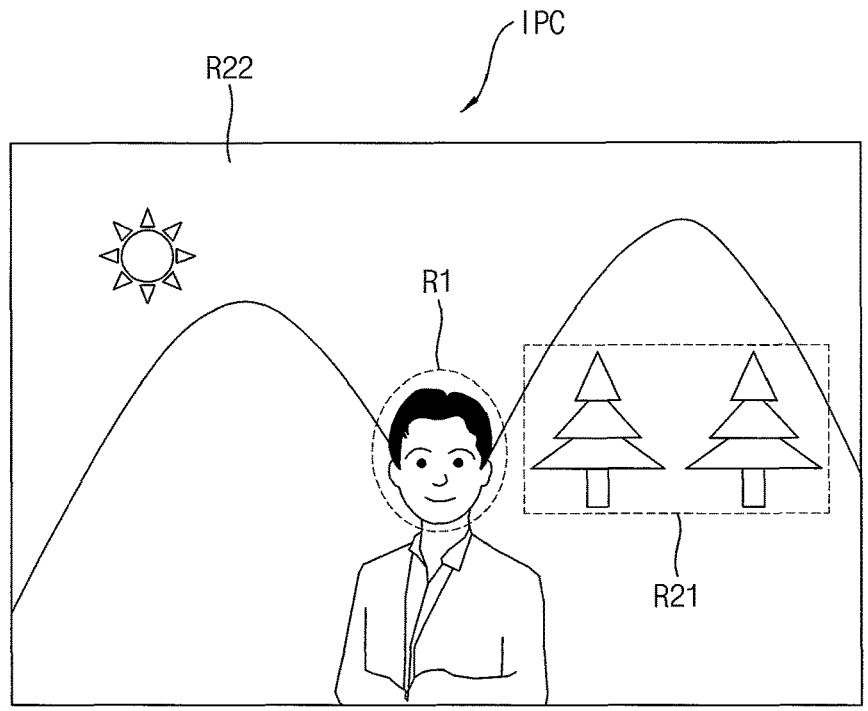
FIG. 14 is a diagram for describing an operation of FIG. 13.

FIG. 13 is a flow chart illustrating another example of determining the quantization parameter for the non-ROI in FIG. 1. FIG. 14 is a diagram for describing an operation of FIG. 13.

Referring to FIGS. 1, 13 and 14, in operation S400, the non-ROI may include a first non-ROI R21 and a second non-ROI R22 having a degree-of-interest lower than that of the first non-ROI R21. For example, in an input picture IPC of FIG. 14, the ROI R1 may correspond to a region of the human's face. The first non-ROI R21 may correspond to a region of trees, and the second non-ROI R22 may correspond to a region other than the ROI R1 and the first non-ROI R21 in the input picture IPC of FIG. 14.

A quantization parameter QP21 for the first non-ROI R21 may be set by adding the first offset parameter OFSP1 to the reference parameter REFP (S411), and a quantization parameter QP22 for the second non-ROI R22 may be set by adding the second offset parameter OFSP2 to the reference parameter REFP (S420).

Figure 15:
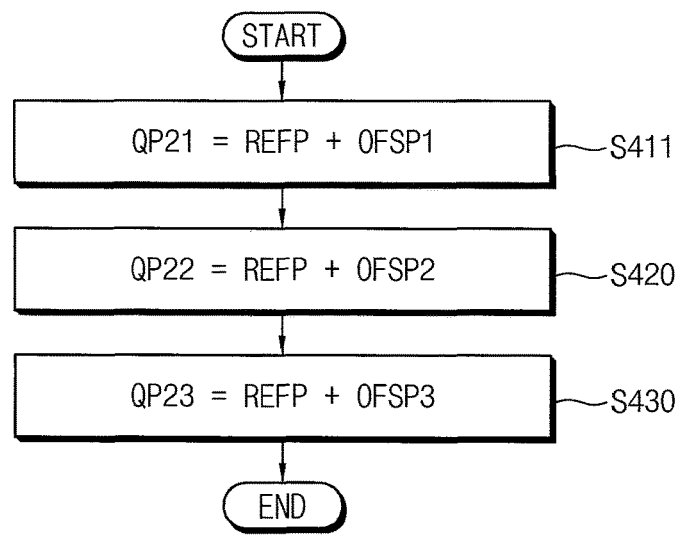
FIG. 15 is a flow chart illustrating still other example of determining the quantization parameter for the non-ROI in FIG. 1.
Figure 16:
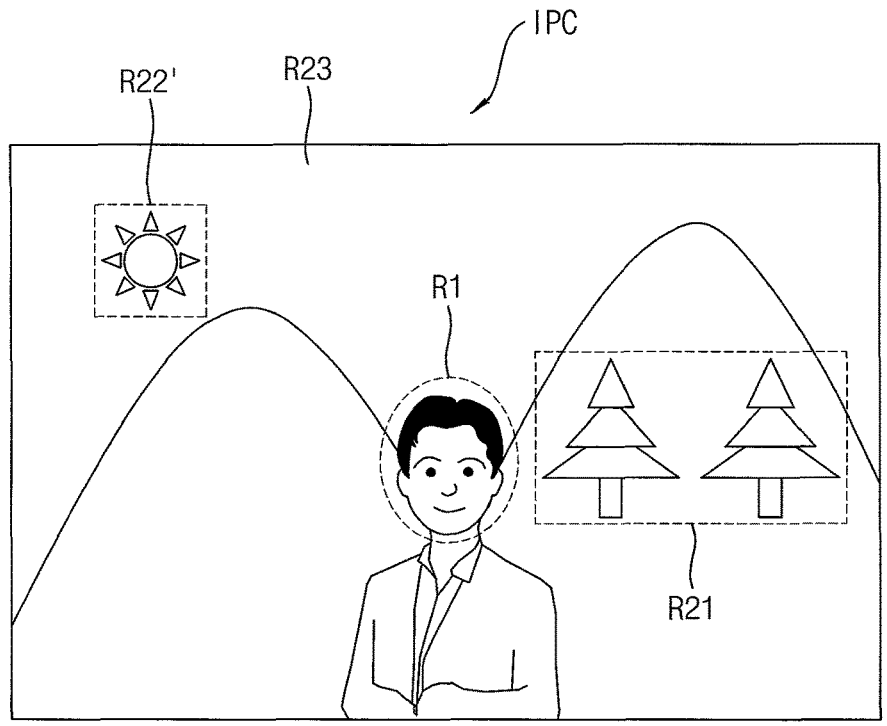
FIG. 16 is a diagram for describing an operation of FIG. 15.

FIG. 15 is a flow chart illustrating still other example of determining the quantization parameter for the non-ROI in FIG. 1. FIG. 16 is a diagram for describing an operation of FIG. 15.

Referring to FIGS. 1, 15 and 16, in operation S400, the non-ROI may include a first non-ROI R21, a second non-ROI R22' having a degree-of-interest lower than that of the first non-ROI R21, and a third non-ROI R23 having a degree-of-interest lower than that of the second non-ROI R22'. For example, in an input picture IPC of FIG. 16, the ROI R1 may correspond to a region of the human's face. The first non-ROI R21 may correspond to a region of trees, the second non-ROI R22' may correspond to a region of the sun, and the third non-ROI R23 may correspond to a region other than the ROI R1 and the first and second non-ROIs R21 and R22' in the input picture IPC of FIG. 16.

A quantization parameter QP21 for the first non-ROI R21 may be set by adding the first offset parameter OFSP1 to the reference parameter REFP (S411), a quantization parameter QP22 for the second non-ROI R22' may be set by adding the second offset parameter OFSP2 to the reference parameter REFP (S420), and a quantization parameter QP23 for the third non-ROI R23 may be set by adding the third offset parameter OFSP3 to the reference parameter REFP (S430).

Figure 17:
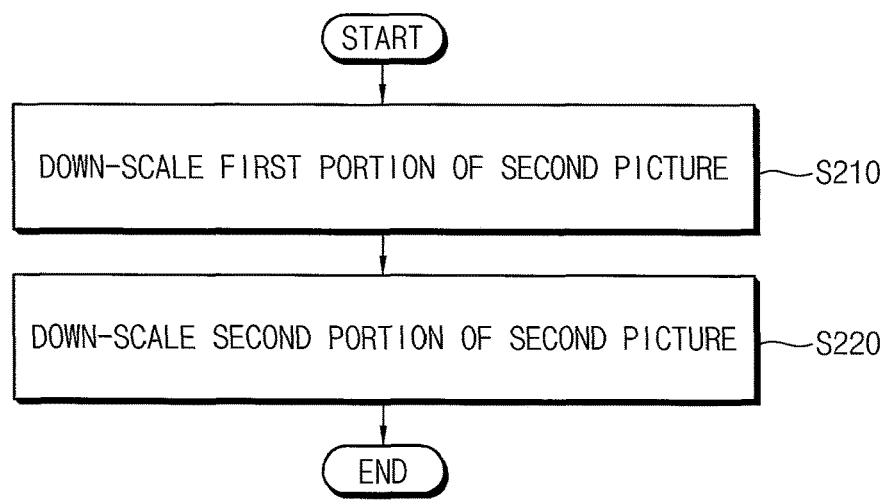
FIGS. 17 and 18 are flow charts illustrating examples of generating a third picture in FIG. 1.
Figure 18:
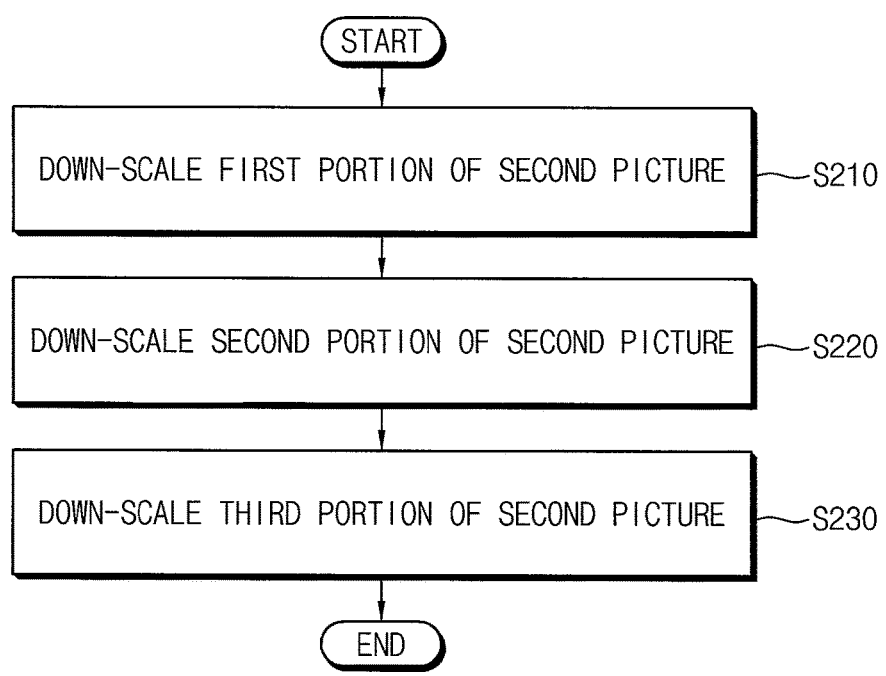

FIGS. 17 and 18 are flow charts illustrating examples of generating a third picture in FIG. 1.

Referring to FIGS. 1, 14 and 17, in operation S200, the non-ROI may include the first non-ROI R21 and the second non-ROI R22. A first portion of the third picture may be generated by down-scaling a first portion of the second picture corresponding to the first non-ROI R21 (S210), and a second portion of the third picture may be generated by down-scaling a second portion of the second picture corresponding to the second non-ROI R22 (S220). A bit-depth of the second portion of the third picture may be lower than a bit-depth of the first portion of the third picture.

In some example embodiments, as described above with reference to FIG. 13, a quantization parameter for the first portion of the second picture may be different from a quantization parameter for the second portion of the second picture. Alternatively, the quantization parameter for the first portion of the second picture may be substantially the same as the quantization parameter for the second portion of the second picture.

Referring to FIGS. 1, 16 and 18, in operation S200, the non-ROI may include the first non-ROI R21, the second non-ROI R22' and the third non-ROI R23. A first portion of the third picture may be generated by down-scaling a first portion of the second picture corresponding to the first non-ROI R21 (S210), a second portion of the third picture may be generated by down-scaling a second portion of the second picture corresponding to the second non-ROI R22' (S220), and a third portion of the third picture may be generated by down-scaling a third portion of the second picture corresponding to the third non-ROI R23 (S230). A bit-depth of the second portion of the third picture may be lower than a bit-depth of the first portion of the third picture, and may be higher than a bit-depth of the third portion of the third picture.

According to example embodiments, a quantization parameter for the first portion of the second picture, a quantization parameter for the second portion of the second picture, and a quantization parameter for the third portion of the second picture may be different from or substantially the same as one another.

In the method of encoding the video data according to example embodiments, different quantization parameters may be determined for the ROIs and/or the non-ROIs that have different degree-of-interests. In addition, partial pictures that correspond to non-ROIs having different degree-of-interests may be down-scaled to have different bit-depths. Thus, the video data may be more efficiently encoded.

The example embodiments will be employed to various examples where the input picture IPC includes any number of ROIs and/or any number of non-ROIs.

Figure 19:
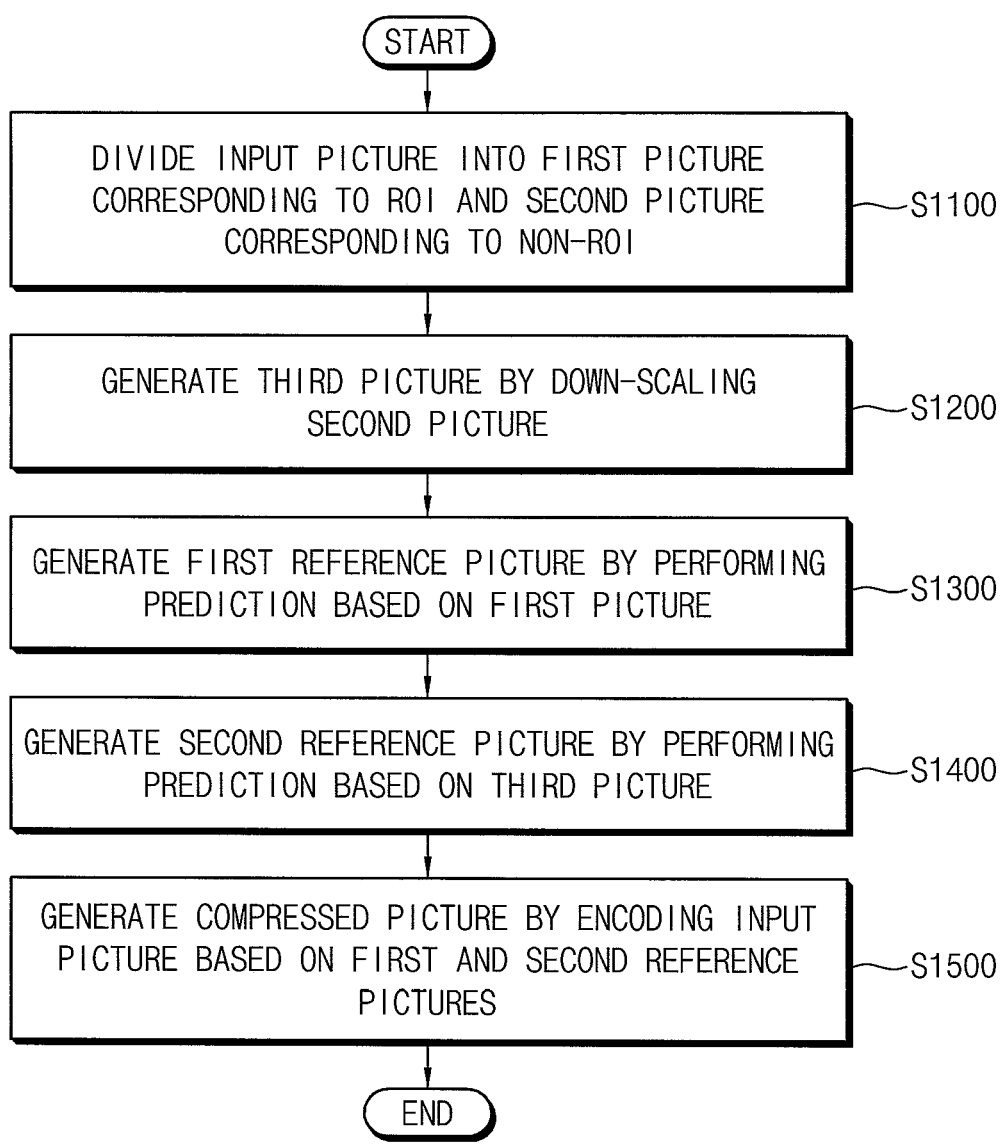
FIG. 19 is a flow chart illustrating a method of encoding video data according to an example embodiment.

FIG. 19 is a flow chart illustrating a method of encoding video data according to example embodiments. In this example embodiment, the video data is encoded in units of the picture.

Referring to FIGS. 2 and 19, in the method of encoding the video data according to example embodiments, an input picture IPC is divided into a first picture and a second picture (S1100), and a third picture is generated by down-scaling the second picture (S1200). Operations S1100 and S1200 may be substantially the same as operations S100 and S200 in FIG. 1, respectively.

A first reference picture is generated by performing a prediction based on the first picture (S1300). For example, at least one of an intra prediction and an inter prediction may be performed for the first picture, and then the first reference picture that corresponds to a result of at least one of the intra prediction and the inter prediction for the first picture may be generated. A second reference picture is generated by performing the prediction based on the third picture (S1400). For example, at least one of the intra prediction and the inter prediction may be performed for the third picture, and then the second reference picture that corresponds to a result of at least one of the intra prediction and the inter prediction for the third picture may be generated. In operations S1300 and S1400, the prediction (e.g., the intra prediction and the inter prediction) may be substantially the same as the prediction that is described with reference to FIG. 3.

A compressed picture is generated by encoding the input picture IPC (e.g., by encoding the first and second pictures) based on the first reference picture and the second reference picture (S1500).

In the method of encoding the video data according to example embodiments, the prediction may be performed for the ROI R1 based on a partial picture having an original bit-depth, the prediction may be performed for the non-ROI R2 based on the other partial picture having a reduced bit-depth, and then the original input picture IPC may be encoded based on results of the predictions. In other words, the adaptive partial encoding may be performed on the input picture IPC. Accordingly, the video data having relatively high quality may be efficiently encoded with relatively low power consumption.

Figure 20:
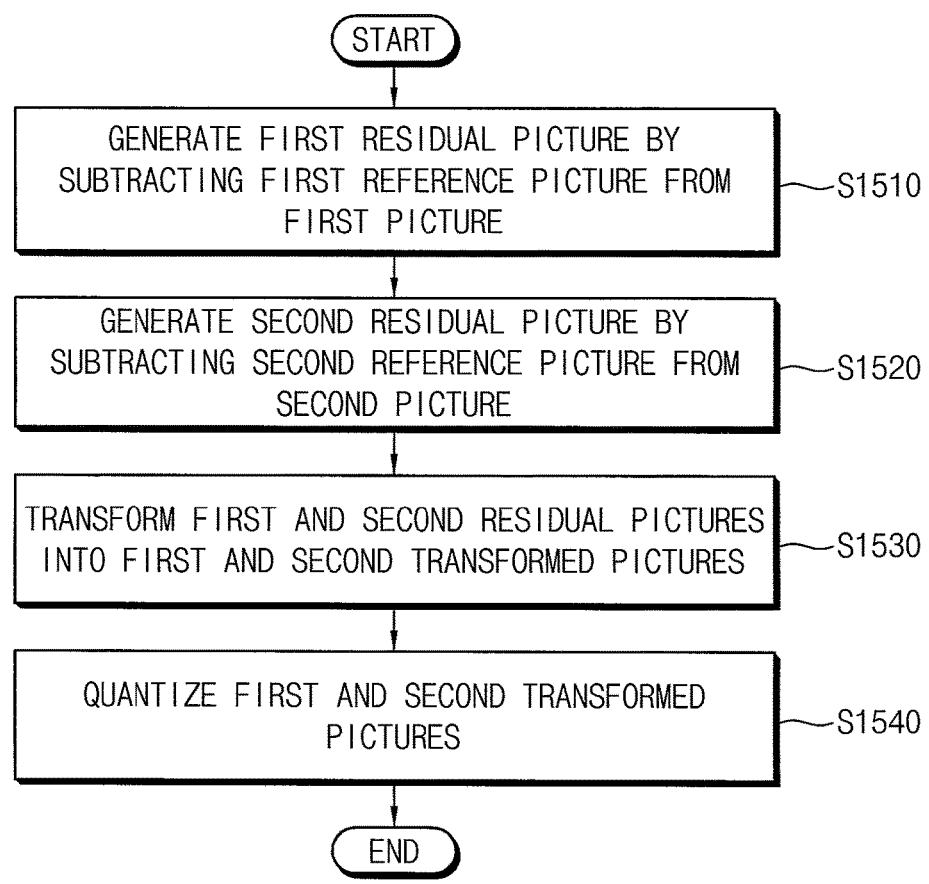
FIG. 20 is a flow chart illustrating an example of generating a compressed picture in FIG. 19.

FIG. 20 is a flow chart illustrating an example of generating a compressed picture in FIG. 19.

Referring to FIGS. 2, 19 and 20, in operation S1500, the first residual picture may be generated by subtracting the first reference picture from the first picture (S1510), and the second residual picture may be generated by subtracting the second reference picture from the second picture (S1520). The first residual picture and the second residual picture may be transformed into the first transformed picture and the second transformed picture, respectively (S1530). The first quantized picture and the second quantized picture may be generated by quantizing the first transformed picture and the second transformed picture (S1540).

In some example embodiments, a quantization parameter for the first transformed picture (e.g., for the ROI R1) may be smaller than a quantization parameter for the second transformed picture (e.g., for the non-ROI R2). Alternatively, the quantization parameter for the first transformed picture may be substantially the same as the quantization parameter for the second transformed picture.

In some example embodiments, operations S1100 and S1200 in FIG. 19 may be performed by the picture analysis module 110 in FIG. 3. Operations S1300 and S1400 in FIG. 19 may be performed by the prediction module 130 in FIG. 3. Operation S1500 in FIG. 19 and operations S1510, S1520, S1530 and S1540 in FIG. 20 may be performed by the compression module 150 in FIG. 3.

Similarly to the examples described with reference to FIGS. 9 through 18, different predictions may be performed for the ROIs and/or the non-ROIs that have different degree-of-interests. In addition, partial pictures that correspond to non-ROIs having different degree-of-interests may be down-scaled to have different bit-depths. Thus, the video data may be more efficiently encoded.

Figure 21:
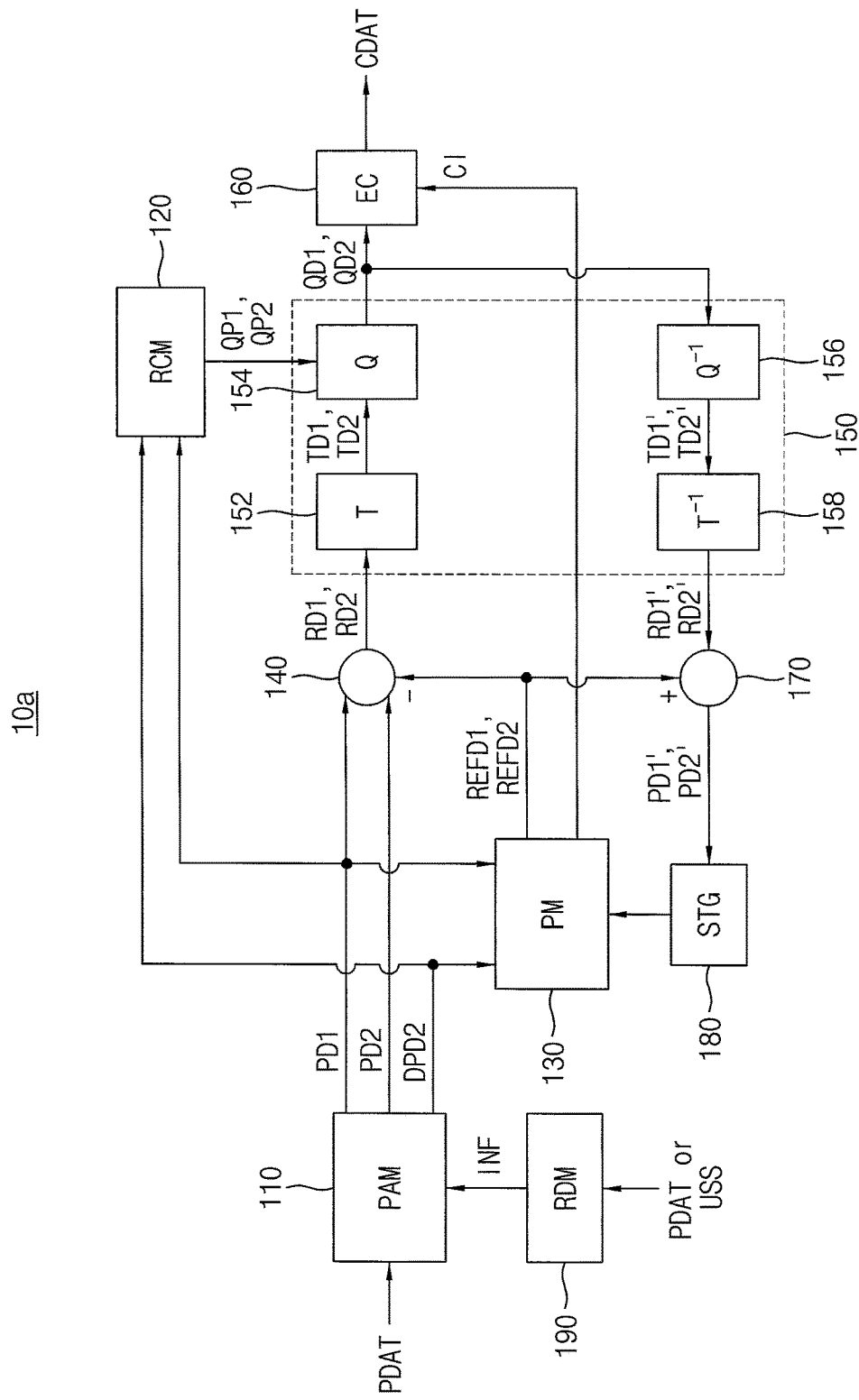
FIG. 21 is a block diagram illustrating a video encoder according to an example embodiment.

FIG. 21 is a block diagram illustrating a video encoder according to example embodiments. In this example embodiment, a video encoder is configured to encode the video data in units of the picture.

Referring to FIGS. 2 and 21, a video encoder 10a includes a picture analysis module 110, a rate control module 120 and a compression module 150. The video encoder 10a may further include a prediction module 130, a subtractor 140, an entropy coder 160, an adder 170, a storage 180 and a ROI detection module (RDM) 190.

The video encoder 10a may be substantially the same as the video encoder 10 of FIG. 3, except that the video encoder 10a further includes the ROI detection module 190.

The ROI detection module 190 may generate the ROI information INF for the ROI R1 and the non-ROI R2 in the input picture IPC. In some example embodiments, the ROI information INF may be generated based on a user setting signal USS that is provided from the user. Alternatively, the ROI information INF may be generated based on the input picture data PDAT of the input picture IPC. For example, the ROI detection module 190 may include a face detection unit, and the ROI information INF may be obtained by detecting a face region in the input picture IPC.

Figure 22:
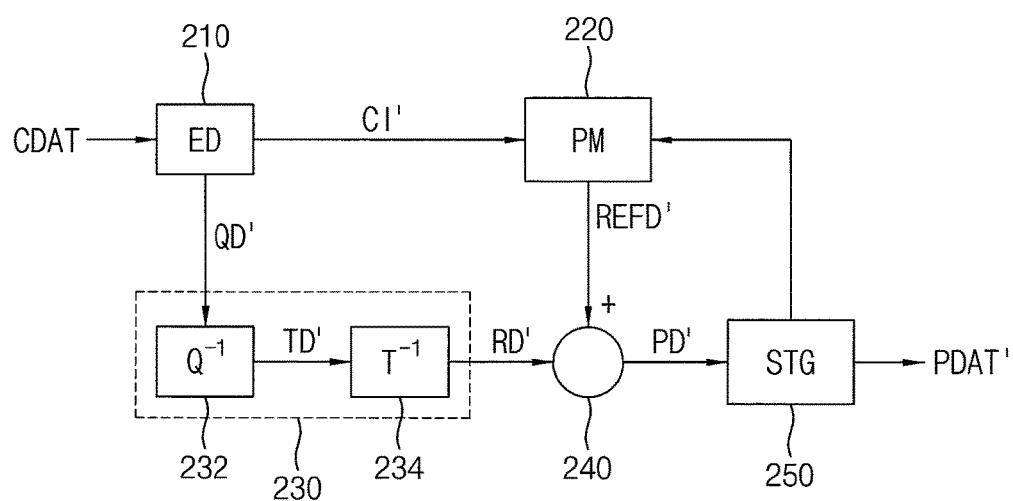
FIG. 22 is a block diagram illustrating a video decoder according to an example embodiment.

FIG. 22 is a block diagram illustrating a video decoder according to example embodiments.

Referring to FIGS. 3 and 22, a video decoder 20 may include an entropy decoder (ED) 210, a prediction module 220, a reconstruction module 230 an adder 240 and a storage 250.

The video decoder 20 may generate a reconstructed picture by reversely decoding the encoded data that is generated by the video encoder 10.

The entropy decoder 210 may perform a decoding with respect to the compressed data CDAT to generate quantized data QD' and information CI' including the result of the predictions, the reference picture identifier, the motion vector, etc. The prediction module 220 may restore reference data REFD' based on the information CI'. The reconstruction module 230 may include an inverse quantization unit 232 and an inverse transform unit 234. The quantized data QD' may be inverse-quantized by the inverse quantization unit 232. The inverse-quantized data TD' may be inverse-transformed by the inverse transform unit 234. The adder 240 may restore the input picture by summing the inverse-transformed data RD' and the reference data REFD'. The restored picture data PD' may be stored in the storage 250, and may be used as the reference picture for encoding the other pictures. The output picture data PDAT' corresponding to the input picture data PDAT may be provided to a display device for displaying a video or an image.

In some example embodiments, the video encoder 10 and the video decoder 20 may be merged in the same integration circuit and/or corresponding software, and then the merged device may be referred to as a video coder/decoder (codec). For example, in the video codec, the entropy coder 160 and the entropy decoder 210 may be merged, and the prediction module 130 and the prediction module 220 may be merged. In addition, each of the inverse quantization units 156 and 232, the inverse transform units 158 and 234, the adders 170 and 240, and the storages 180 and 250 may be also merged, respectively.

Figure 23:
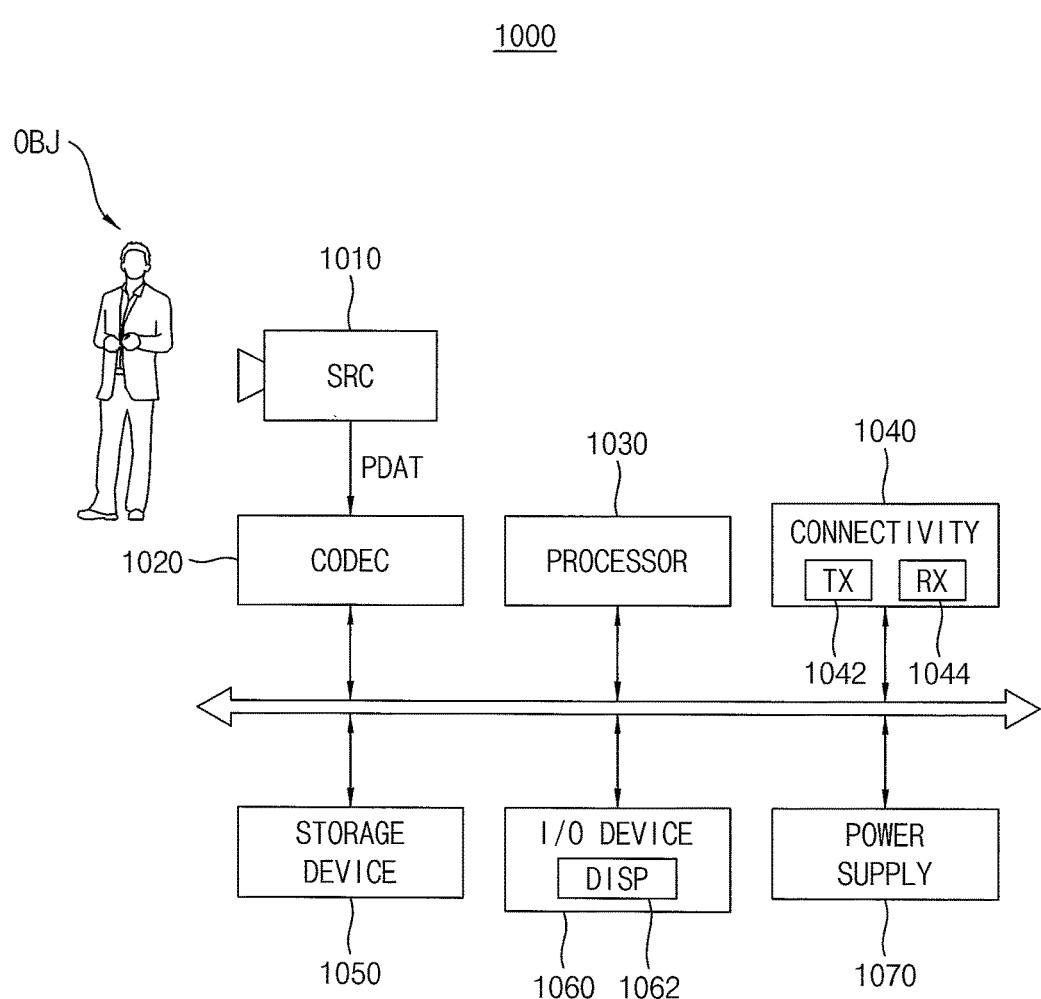
FIG. 23 is a block diagram illustrating an electronic system according to an example embodiment.

FIG. 23 is a block diagram illustrating an electronic system according to example embodiments.

Referring to FIGS. 2 and 23, an electronic system 1000 includes a video source 1010 and a video codec 1020. The electronic system 1000 may further include a processor 1030, a connectivity 1040, a storage device 1050, an input/output (I/O) device 1060 and a power supply 1070.

The video source 1010 provides the input picture data PDAT corresponding to the input picture IPC. In some example embodiments, the video source 1010 may include a video pickup device that generates the input picture IPC by obtaining image information of an object OBJ. Alternatively, the video source 1010 may include a storage that stores the input picture data PDAT.

The video codec 1020 may include a video encoder and a video decoder according to example embodiments. The video encoder and the video decoder in the video codec 1020 may be merged in the same integration circuit and/or corresponding software. The video encoder may be one of the video encoder 10 of FIG. 3 and the video encoder 10a of FIG. 21, and may operate according to the examples described with reference to FIGS. 1 through 21. For example, the video encoder may determine the quantization parameter for the ROI R1 and/or may perform the prediction for the ROI R1 based on a partial picture having an original bit-depth. The video encoder may determine the quantization parameter for the non-ROI R2 and/or may perform the prediction for the non-ROI R2 based on the other partial picture having a reduced bit-depth. The video encoder may encode the original input picture IPC based on the differently determined quantization parameters and/or the results of the predictions. Accordingly, the video encoder may efficiently encode the video data having relatively high quality with relatively low power consumption.

In some example embodiment, at least a portion of the operations for encoding the input picture IPC may be performed by instructions (e.g., a software program) that are executed by the video codec 1020 and/or the processor 1030 and are stored in the storage device 1050. Alternatively, at least a portion of the operations for encoding the input picture IPC may be performed by hardware implemented in the video codec 1020 and/or the processor 1030.

The processor 1030 may perform various computational functions such as particular calculations and tasks. For example, the processor 1030 may be a central processing unit (CPU), a microprocessor, an application processor (AP), etc. The processor 1030 may execute an operating system (OS) to drive the electronic system 1000, and may execute various applications for providing an internet browser, a game, a video, a camera, etc.

In some example embodiments, the processor 1030 may include a single processor core or multiple processor cores. In some example embodiments, the processor 1030 may further include a cache memory that is located inside or outside the processor 1030.

The connectivity 1040 may communicate with an external device. For example, the connectivity 1040 may communicate according to one of various types of protocols such as universal serial bus (USB), Ethernet, near field communication (NFC), radio frequency identification (RFID), a mobile telecommunication like 3-generation (3G), 4-generation (4G), long term evolution (LTE) and LTE-advanced (LTE-A), a memory card interface. For example, the connectivity 1040 may include a baseband chipset, and may support a communication such as GSM, GPRS, WCDMA, or HSxPA, etc. For example, the connectivity 1040 may include a transmitter 1042 and a receiver 1044.

The storage device 1050 may operate as a data storage for data processed by the video codec 1020 or the processor 1030, or as a working memory. For example, the storage device 1050 may store a boot image for booting the electronic system 1000, a file system for the operating system to drive the electronic system 1000, a device driver for an external device connected to the electronic system 1000, and/or an application executed on the electronic system 1000. For example, the storage device 1050 may include a volatile memory such as a dynamic random access memory (DRAM), a static random access memory (SRAM), a mobile DRAM, a double data rate (DDR) synchronous DRAM (SDRAM), a low power DDR (LPDDR) SDRAM, a graphic DDR (GDDR) SDRAM, or a Rambus DRAM (RDRAM), etc., and a non-volatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc.

The I/O device 1060 may include at least one input device such as a keypad, a button, a microphone, a touch screen, etc., and/or at least one output device such as a speaker, a display device, etc. For example, the I/O device 1060 may include a display device 1062. The power supply 1070 may provide power to the electronic system 1000.

In some example embodiment, the electronic system 1000 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation system, etc. The mobile system may further include a wearable device, an internet of things (IoT) device, an internet of everything (IoE) device, an e-book, a virtual reality (VR) device, a robotic device, etc.

In some example embodiment, the electronic system 1000 may be any computing system, such as a personal computer (PC), a server computer, a workstation, a tablet computer, a laptop computer, a mobile phone, a smart phone, a PDA, a PMP, a digital camera, a digital television, a set-top box, a music player, a portable game console, a navigation device, etc.

According to example embodiments, the electronic system 1000 and/or components of the electronic system 1000 may be packaged in various forms, such as a package on package (PoP), a ball grid arrays (BGA), a chip scale packages (CSP), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline IC (SOIC), a shrink small outline package (SSOP), a thin small outline package (TSOP), a system in package (SIP), a multi chip package (MCP), a wafer-level fabricated package (WFP), or a wafer-level processed stack package (WSP).

Figure 24:
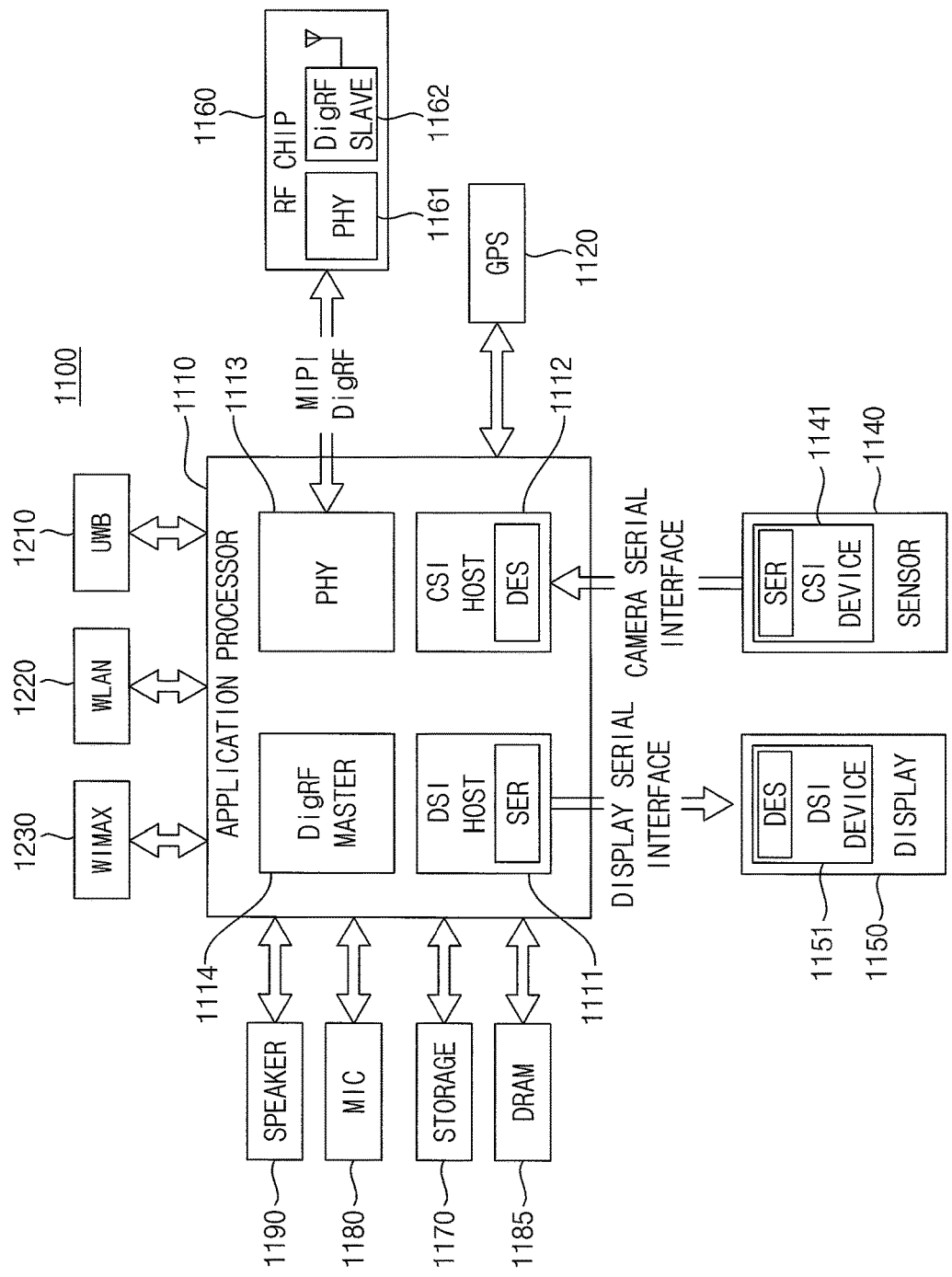
FIG. 24 is a block diagram illustrating an interface employable in an electronic system according to example embodiments.

FIG. 24 is a block diagram illustrating an interface employable in an electronic system according to example embodiments.

Referring to FIG. 24, an electronic system 1100 may be implemented by a data processing device that uses or supports a mobile industry processor interface (MIPI®) interface. The electronic system 1100 may include an application processor 1110, an image sensor 1140, a display device 1150, etc. A CSI host 1112 of the application processor 1110 may perform serial communication with a CSI device 1141 of the image sensor 1140 via a camera serial interface (CSI). In some example embodiments, the CSI host 1112 may include a deserializer (DES), and the CSI device 1141 may include a serializer (SER). A DSI host 1111 of the application processor 1110 may perform serial communication with a DSI device 1151 of the display device 1150 via a display serial interface (DSI).

In some example embodiments, the DSI host 1111 may include a serializer (SER), and the DSI device 1151 may include a deserializer (DES). The electronic system 1100 may further include a radio frequency (RF) chip 1160 that performs communication with the application processor 1110. A physical layer (PHY) 1113 of the electronic system 1100 and a physical layer (PHY) 1161 of the RF chip 1160 may perform data communications based on a MIPI® DigRFSM. The application processor 1110 may further include a DigRFSM MASTER 1114 that controls the data communications of the PHY 1161.

The electronic system 1100 may further include a global positioning system (GPS) 1120, a storage 1170, a MIC 1180, a DRAM device 1185, and a speaker 1190. In addition, the electronic system 1100 may perform communication using an ultra-wideband (UWB) 1210, a wireless local area network (WLAN) 1220, a worldwide interoperability for microwave access (WIMAX) 1230, etc. However, the structure and the interface of the electronic system 1100 are not limited thereto.

Figure 25:
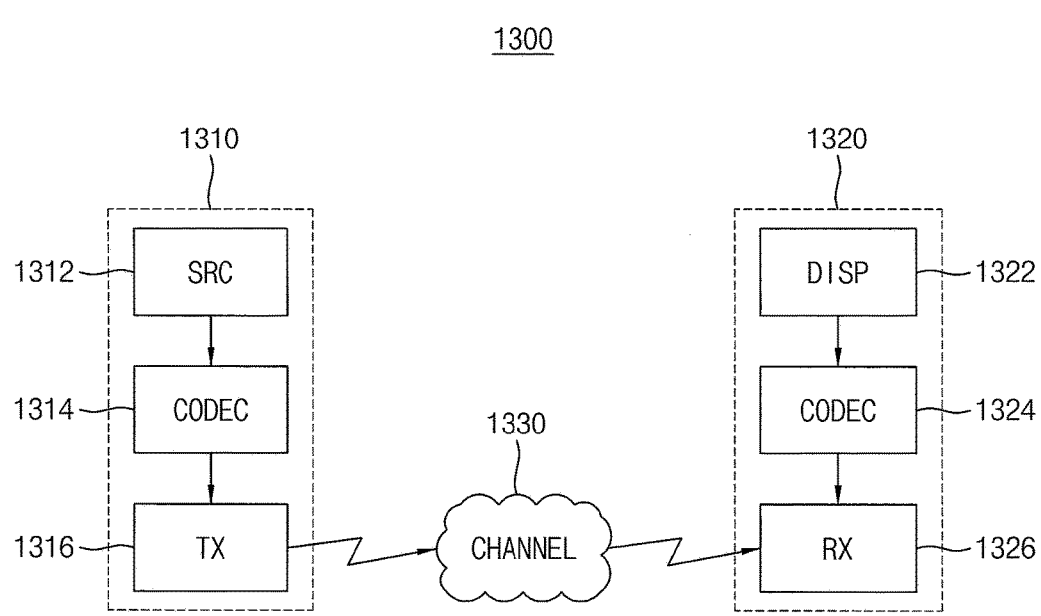
FIG. 25 is a block diagram illustrating a communication system including an electronic system according to an example embodiment.

FIG. 25 is a block diagram illustrating a communication system including an electronic system according to example embodiments.

Referring to FIG. 25, a communication system 1300 may include a first electronic system 1310 and a second electronic system 1320. The first electronic system 1310 may communicate with the second electronic system 1320 via a channel 1330. For example, the communication system 1300 may be a video-call system, a video telephony system, etc.

Each of the first and second electronic systems 1310 and 1320 may be the electronic system 1000 of FIG. 23. Some elements of the first and second electronic systems 1310 and 1320 that are irrelevant to an operation of the communication system 1300 are omitted in FIG. 25 for convenience of illustration.

The first electronic system 1310 may include a video source 1312, a video codec 1314 and a transmitter 1316. The video source 1312 may provide the video data. The video codec 1314 may encode the video data. The transmitter 1316 may transmit the encoded video data to the second electronic system 1320 via the channel 1330.

The second electronic system 1320 may include a display device 1322, a video codec 1324 and a receiver 1326. The receiver 1326 may receive the encoded video data transmitted from the first electronic system 1310. The video codec 1324 may decode the encoded video data. The display device 1322 may display a video or an image based on the decoded video data.

Each of the video codec 1314 and the video codec 1324 may include a video encoder and a video decoder according to example embodiments, and may operate according to the examples described with reference to FIGS. 1 through 21.

The first electronic system 1310 and the second electronic system 1320 may perform bi-directional communication via the channel 1330. For example, the channel 1330 may be one of various types of communication channels such as Wi-Fi, WIBRO, mobile telecommunication like 3G, 4G, LTE and LTE-A, etc.

Figure 26:
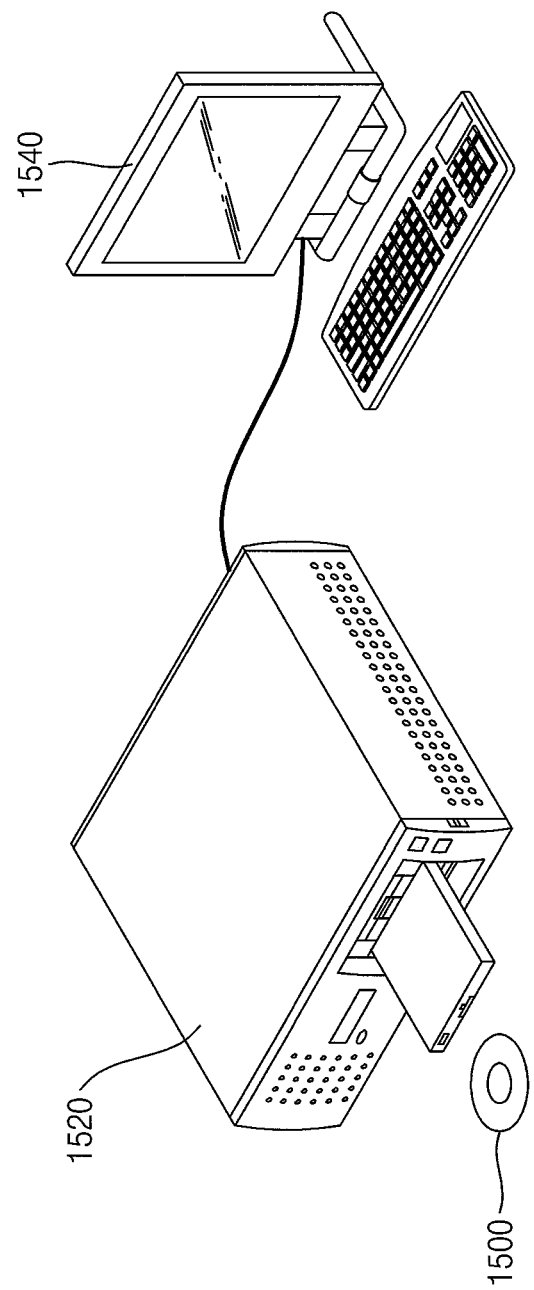
FIG. 26 is a diagram illustrating a computer readable medium according to an example embodiment.

FIG. 26 is a diagram illustrating a computer readable medium according to example embodiments.

Referring to FIG. 26, the video encoder and the method of encoding the video data according to example embodiments may be embodied as a system, method, computer program product, and/or a computer program product embodied in one or more computer readable medium(s) 1500 having computer readable program code embodied thereon. The computer readable program code may be provided to a processor of a general purpose computer, special purpose computer, or other programmable data processing apparatus 1500 based on a reader 1520. The computer readable medium 1500 may be a computer readable signal medium or a computer readable storage medium. The computer readable storage medium 1500 may be any tangible medium that can contain, or store a program for use by or in connection with an instruction execution system, apparatus, or device. For example, the computer readable medium 1500 may be a non-transitory computer readable medium.

Although FIG. 26 illustrates an example where the computer readable medium 1500 is a disk and the reader 1520 is a disk drive, the computer readable medium 1500 may be one of various types of mediums such as a cassette, CD-ROM, DVD, Blu-ray, a memory card, a solid state drive (SSD), etc.

Figure 27:
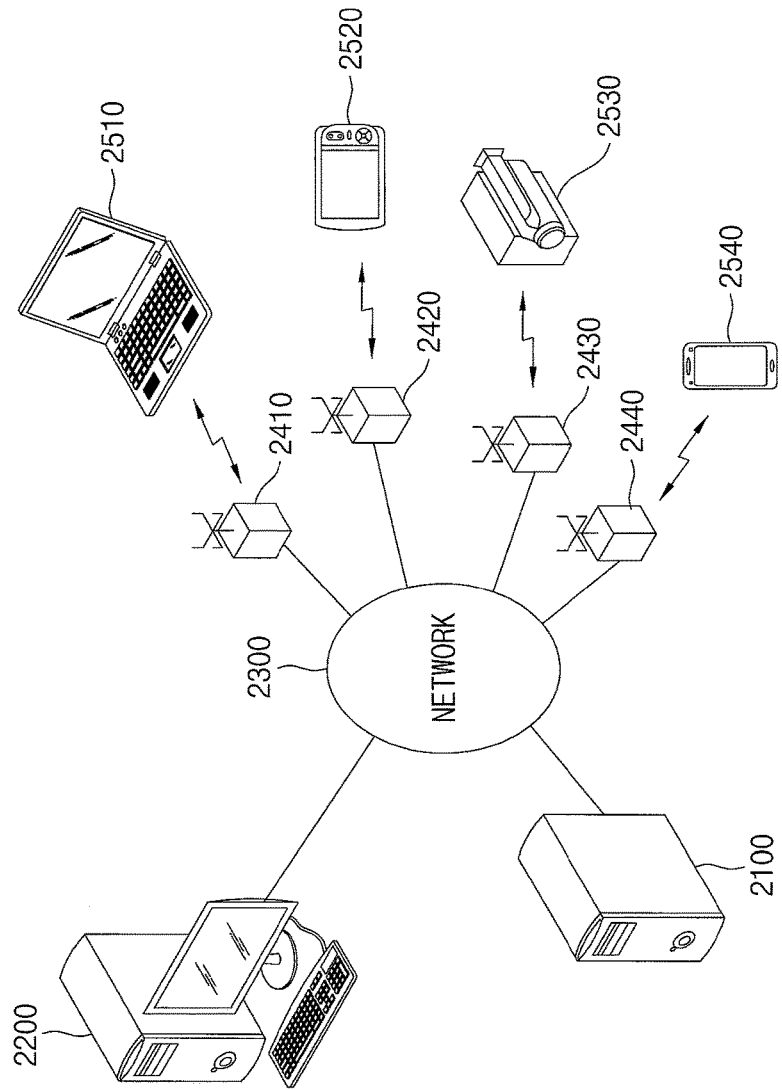
FIG. 27 is a diagram illustrating a content supply system according to an example embodiment.

FIG. 27 is a diagram illustrating a content supply system according to example embodiments.

Referring to FIG. 27, a content supply system 2000 may include a service provider 2100, a streaming server 2200, a network 2300, a plurality of base stations 2410, 2420, 2430 and 2440, and a plurality of user devices 2510, 2520, 2530 and 2540.

In the content supply system 2000, a service area of for providing content distribution services may be divided into a plurality of cells, each of which has a predetermined size. Each of the base stations 2410~2440 may be arranged in each cell.

The plurality of user devices 2510~2540 may include a laptop computer, a PDA, a video camera, a cellular phone, etc. The plurality of user devices 2510~2540 may be connected to the service provider 2100 and the streaming server 2200 via the plurality of base stations 2410~2440 and the network 2300. The plurality of user devices 2510~2540 may be directly connected to the network 2300 without the base stations 2410~2440.

The service provider 2100 and/or the streaming server 2200 may provide video contents to the plurality of user devices 2510~2540, and/or may receive video contents from the plurality of user devices 2510~2540. The service provider 2100, the streaming server 2200 and/or the plurality of user devices 2510~2540 may provide encoded video contents, and thus each of the service provider 2100, the streaming server 2200 and the plurality of user devices 2510~2540 may include the video encoder according to example embodiments and/or may perform the method of encoding the video data according to example embodiments.

Figure 28:
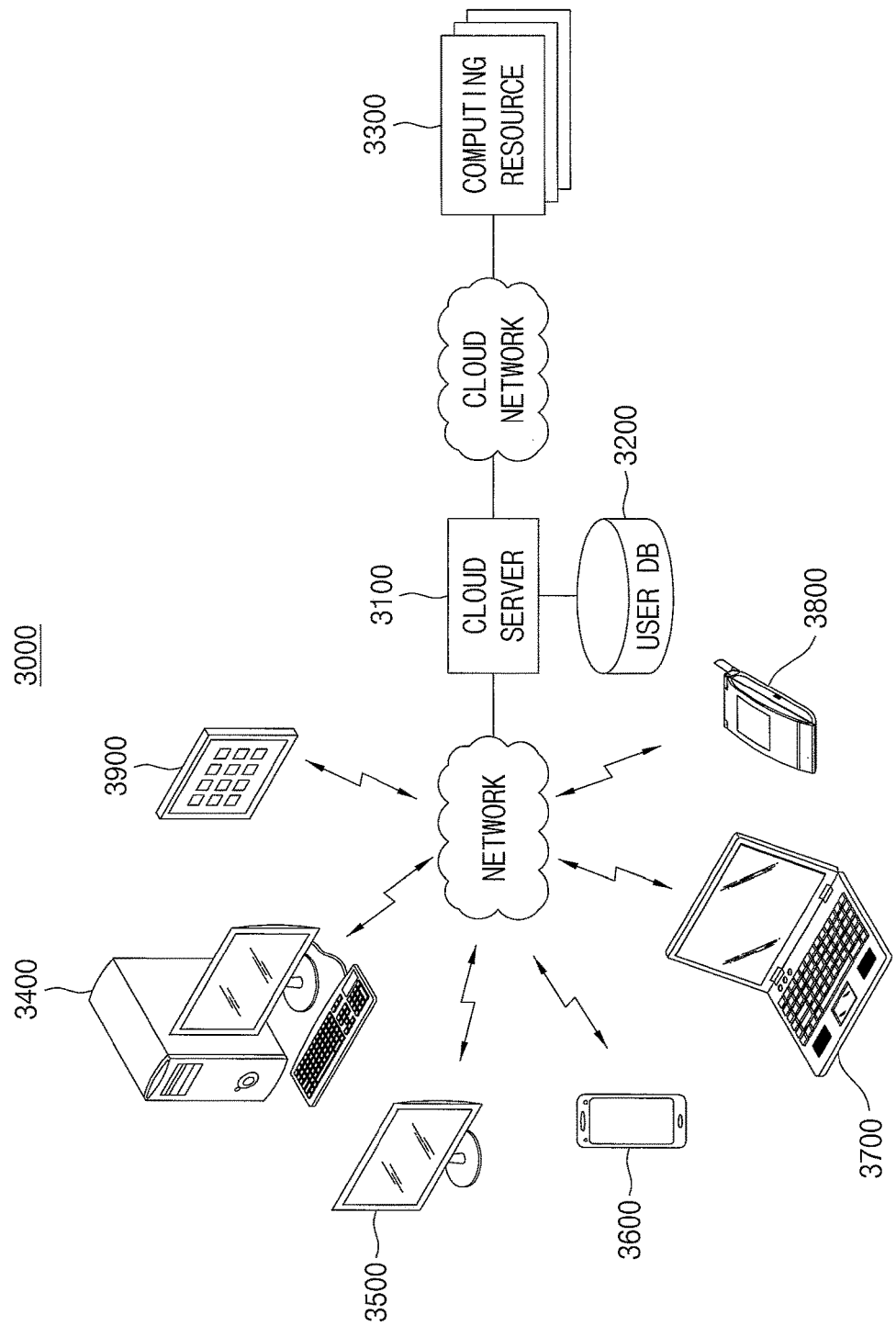
FIG. 28 is a diagram illustrating a cloud computing system according to an example embodiment.

FIG. 28 is a diagram illustrating a cloud computing system according to example embodiments.

Referring to FIG. 28, a cloud computing system 3000 may include a cloud computing server 3100, a user database 3200, a computing resource 3300 and a plurality of user devices 3400, 3500, 3600, 3700, 3800 and 3900.

In the cloud computing system 3000, on-demand outsourcing services may be provided to the plurality of user devices 3400~3900 via a network such as an internet network. The computing resource 3300 may be physically separated, however, the service provider in the cloud computing system 3000 may provide such services by merging the computing resource 3300 based on virtualization. The service users may not install such services in the plurality of user devices 3400~3900, and may access such services on a virtual space.

The plurality of user devices 3400~3900 may include a PC, a smart TV, a smart phone, a laptop computer, a tablet computer, a PMP, etc. The plurality of user devices 3400~3900 may be connected to the cloud computing server 3100 via the network. The user information for accessing the cloud computing services may be stored in the user database 3200. For example, the user information may include login information and private information such as a name, an address, a credit card number, etc.

The plurality of user devices 3400~3900 may be provided the cloud computing services, e.g., video services, from the cloud computing server 3100. The cloud computing server 3100 may merge the distributed computing resource 3300 to provide the merged computing resource 3300 to the plurality of user devices 3400~3900. The cloud computing server 3100 and/or the plurality of user devices 3400~3900 may provide encoded video services, and thus each of the cloud computing server 3100 and the plurality of user devices 3400~3900 may include the video encoder according to example embodiments and/or may perform the method of encoding the video data according to example embodiments.

The present disclosure may be applied to various devices and/or systems that encode video data based on a GOP. Particularly, some example embodiments of the inventive concept may be applied to a video encoder that is compatible with standards such MPEG, H.261, H.262, H.263 and H.264. Some example embodiments of the inventive concept may be adopted in technical fields such as CATV (Cable TV on optical networks, copper, etc.), DBS (Direct broadcast satellite video services), DSL(Digital subscriber line video services), DTTB (Digital terrestrial television broadcasting), ISM (Interactive storage media (optical disks, etc.)), MMM (Multimedia mailing), MSPN (Multimedia services over packet networks), RTC (Real-time conversational services (videoconferencing, videophone, etc.)), RVS (Remote video surveillance), SSM (Serial storage media (digital VTR, etc.)).

Although a few example embodiments have been described, those skilled in the art will readily appreciate that many modifications are possible in the example embodiments without materially departing from the novel teachings and advantages of the present disclosure. It is to be understood that the foregoing is illustrative of various example embodiments and is not to be construed as limited to the specific example embodiments disclosed, and that modifications to the disclosed example embodiments, as well as other example embodiments, are intended to be included within the scope of the inventive concept as defined in the appended claims.

What is claimed is:

1. A method of encoding video data, the method comprising:
dividing an input picture into a first picture corresponding to a region of interest (ROI) and a second picture corresponding to a non-region of interest (non-ROI);
generating a third picture by down-scaling the second picture;
setting a quantization parameter for the ROI by subtracting an offset parameter from a reference parameter;
setting a quantization parameter for the non-ROI by adding the offset parameter to the reference parameter; and
generating a compressed picture by encoding the input picture based on the quantization parameter for the ROI and the quantization parameter for the non-ROI,
wherein a bit-depth of the third picture is lower than a bit-depth of the first picture, and the bit-depth of the third picture is lower than a bit-depth of the second picture,
wherein the non-ROI comprises a first non-ROI, and a second non-ROI having a degree-of-interest lower than a degree-of-interest of the first non-ROI,
wherein the generating the third picture comprises:
generating a first portion of the third picture by down-scaling a first portion of the second picture corresponding to the first non-ROI; and
generating a second portion of the third picture by down-scaling a second portion of the second picture corresponding to the second non-ROI, and
wherein a bit-depth of the second portion of the third picture is lower than a bit-depth of the first portion of the third picture.

2. The method of claim 1, wherein the quantization parameter for the ROI is smaller than the quantization parameter for the non-ROI.

3. The method of claim 2, wherein the ROI comprises a first ROI, and a second ROI having a degree-of-interest higher than a degree-of-interest of the first ROI,
wherein the determining the quantization parameter for the ROI comprises:
setting a quantization parameter for the first ROI by subtracting a first offset parameter from the reference parameter; and
setting a quantization parameter for the second ROI by subtracting a second offset parameter from the reference parameter, the second offset parameter being greater than the first offset parameter.

4. The method of claim 2, wherein
the determining the quantization parameter for the non-ROI comprises:

setting a quantization parameter for the first non-ROI by adding a first offset parameter to the reference parameter; and setting a quantization parameter for the second non-ROI by adding a second offset parameter to the reference parameter, the second offset parameter being greater than the first offset parameter.

5. The method of claim 1, wherein the generating the compressed picture comprises:

generating a first transformed picture by performing a transformation based on the first picture;

generating a second transformed picture by performing the transformation based on the second picture;

quantizing the first transformed picture based on the quantization parameter for the ROI; and quantizing the second transformed picture based on the quantization parameter for the non-ROI.

6. The method of claim 1, wherein the dividing the input picture into the first picture and the second picture comprises:

dividing the input picture into a plurality of picture blocks;

categorizing, based on ROI information, the plurality of picture blocks as first picture blocks corresponding to the ROI or second picture blocks corresponding to the non-ROI;

setting the first picture blocks as the first picture; and setting the second picture blocks as the second picture.

7. A method of encoding video data, the method comprising:

dividing an input picture into a first picture corresponding to a region of interest (ROI) and a second picture corresponding to a non-region of interest (non-ROI);

generating a third picture by down-scaling the second picture;

generating a first reference picture by performing a prediction based on the first picture;

generating a second reference picture by performing the prediction based on the third picture; and generating a compressed picture by encoding the input picture based on the first reference picture and the second reference picture, wherein the non-ROI comprises a first non-ROI and a second non-ROI having a degree-of-interest lower than that of the first non-ROI, wherein the generating the third picture comprises:

generating a first portion of the third picture by down-scaling a first portion of the second picture corresponding to the first non-ROI; and generating a second portion of the third picture by down-scaling a second portion of the second picture corresponding to the second non-ROI, wherein a bit-depth of the first portion of the third picture is higher than a bit-depth of the second portion of the third picture.

8. The method of claim 7, a bit-depth of the first picture is higher than a bit-depth of the third picture, and a bit-depth of the second picture is higher than the bit-depth of the third picture.

9. The method of claim 7, wherein the generating the first reference picture comprises:

performing at least one of an intra prediction and an inter prediction for the first picture; and generating the first reference picture that corresponds to a result of the at least one of the intra prediction and the inter prediction for the first picture.

10. The method of claim 9, wherein the generating the second reference picture comprises:

performing at least one of the intra prediction and the inter prediction for the third picture; and generating the second reference picture that corresponds to a result of the at least one of the intra prediction and the inter prediction for the third picture.

11. The method of claim 7, wherein the generating the compressed picture comprises:

generating a first residual picture by subtracting the first reference picture from the first picture;

generating a second residual picture by subtracting the second reference picture from the second picture;

transforming the first residual picture and the second residual picture into a first transformed picture and a second transformed picture, respectively; and quantizing the first transformed picture and the second transformed picture.

12. The method of claim 11, wherein a quantization parameter for the first transformed picture is smaller than a quantization parameter for the second transformed picture.

13. A method of encoding video data, the method comprising:

dividing an input picture into a plurality of pictures comprising a first picture corresponding to a region of interest (ROI) and a second picture corresponding to a non-region of interest (non-ROI);

generating a third picture based on the second picture, the third picture having a bit-depth that is less than a bit-depth of the second picture; and encoding the input picture based on the first picture and the third picture, wherein the encoding the input picture comprises:

setting a first quantization parameter by subtracting an offset parameter from a reference parameter;

setting a second quantization parameter by adding the offset parameter to the reference parameter; and generating a compressed picture by encoding the input picture based on the first quantization parameter and the second quantization parameter, wherein a bit-depth of the third picture is lower than a bit-depth of the first picture, and the bit-depth of the third picture is lower than a bit-depth of the second picture, wherein the non-ROI comprises a first non-ROI, and a second non-ROI having a degree-of-interest lower than a degree-of-interest of the first non-ROI, wherein the generating the third picture comprises:

generating a first portion of the third picture by down-scaling a first portion of the second picture corresponding to the first non-ROI; and generating a second portion of the third picture by down-scaling a second portion of the second picture corresponding to the second non-ROI, and wherein a bit-depth of the second portion of the third picture is lower than a bit-depth of the first portion of the third picture.

14. The method of claim 13, wherein the encoding the input picture comprises generating a first reference picture by performing a prediction based on the first picture;

generating a second reference picture by performing the prediction based on the third picture; and generating the compressed picture by encoding the input picture based on the first reference picture and the second reference picture.

* * * * *